United States Patent [19]
Ziu

[11] Patent Number: 5,862,834
[45] Date of Patent: Jan. 26, 1999

[54] PIPE SUPPORT FOR PERMITTING LATERAL AND LONGTUDINAL MOVEMENT OF AN INNER PIPE RELATIVE TO AN OUTER PIPE IN A DOUBLE-CONTAINMENT PIPE ASSEMBLY

[76] Inventor: Christopher G. Ziu, 9 Douglas St., Merrimack, N.H. 03054

[21] Appl. No.: 473,222

[22] Filed: Jun. 7, 1995

Related U.S. Application Data

[60] Division of Ser. No. 89,745, Jul. 9, 1993, Pat. No. 5,482,088, which is a continuation-in-part of Ser. No. 37,083, Mar. 25, 1993, abandoned.

[51] Int. Cl.$^6$ ....................................................... F16L 3/10
[52] U.S. Cl. ........................... 138/113; 138/108; 138/112; 138/114
[58] Field of Search ..................................... 138/103, 106, 138/108, 111, 112, 113, 114

[56] References Cited

U.S. PATENT DOCUMENTS

| | | | |
|---|---|---|---|
| 262,670 | 8/1882 | Holly | 138/113 |
| 430,010 | 6/1890 | Flad . | |
| 666,361 | 1/1901 | Smead . | |
| 1,140,633 | 5/1915 | Trucano . | |
| 1,160,703 | 11/1915 | Fleming . | |
| 1,440,978 | 1/1923 | Feligen | 138/113 |
| 1,479,470 | 1/1924 | Kuehn | 138/113 |
| 1,737,161 | 11/1929 | Jupp | 138/113 |
| 1,824,717 | 9/1931 | Harty et al. | 138/113 |
| 1,846,550 | 2/1932 | Gottwald . | |
| 1,909,075 | 5/1933 | Ricker et al. . | |
| 1,931,465 | 10/1933 | Gysling | 138/113 |
| 2,050,968 | 8/1936 | Gottward et al. | 138/113 |
| 2,475,635 | 7/1949 | Parsons | 138/65 |
| 2,603,347 | 7/1952 | Fish | 206/16 |
| 2,707,095 | 4/1955 | Parsons et al. | 138/111 |
| 2,849,027 | 8/1958 | Tetyak | 138/48 |
| 2,875,987 | 3/1959 | LaValley | 257/254 |
| 2,914,090 | 11/1959 | Isenberg | 138/63 |
| 3,065,768 | 11/1962 | Delsa | 138/148 |
| 3,207,533 | 9/1965 | Van Gundy et al. | 285/31 |
| 3,250,297 | 5/1966 | Monneyham | 138/113 |
| 3,361,870 | 1/1968 | Whitehead | 138/111 |
| 3,417,785 | 12/1968 | Andrews | 138/108 |
| 3,530,680 | 9/1970 | Gardner | 138/113 |
| 3,642,308 | 2/1972 | Zeile, Jr. et al. | 285/47 |
| 3,730,228 | 5/1973 | Gibbs, Sr. | 138/106 |
| 3,765,629 | 10/1973 | Voelker et al. | 248/68 |
| 3,789,129 | 1/1974 | Ditscheid | 174/28 |
| 3,856,246 | 12/1974 | Sinko | 248/68 |
| 3,863,679 | 2/1975 | Young | 138/106 |
| 3,865,145 | 2/1975 | McCay et al. | 138/113 |
| 3,964,754 | 6/1976 | Murai et al. | 277/101 |
| 4,023,831 | 5/1977 | Thompson | 285/113 |
| 4,036,617 | 7/1977 | Leonard et al. | 62/55 |
| 4,049,480 | 9/1977 | Kutschke | 156/94 |
| 4,098,476 | 7/1978 | Jutte et al. | 138/113 |

(List continued on next page.)

*Primary Examiner*—David Scherbel
*Assistant Examiner*—James F. Hook
*Attorney, Agent, or Firm*—McCormick, Paulding & Huber

[57] ABSTRACT

A double-containment piping assembly has two anchor supports, and at least one elbow fitting with an outer elbow section and an inner elbow section received within the inner elbow section. A first leg having a first inner pipe received within a first outer pipe is coupled between an anchor support and the elbow fitting. A second leg having a second inner pipe received within a second outer pipe is coupled between the other anchor support and the other side of the elbow fitting. First flexibility supports are mounted on either side of the elbow fitting, and permit axial and lateral movement of the inner pipe relative to the outer pipe in the areas of the elbow. First axial-guiding supports, which permit axial movement of the inner pipe relative to the outer pipe, but prevent lateral movement of the inner pipe, are each mounted a minimum distance from the elbow fitting between the inner and outer pipes. Any differential expansion of the inner and outer pipes relative to each other accumulates at the elbow fitting, and is absorbed by movement of the inner elbow section relative to the outer elbow section.

20 Claims, 18 Drawing Sheets

U.S. PATENT DOCUMENTS

| | | | |
|---|---|---|---|
| 4,100,367 | 7/1978 | Netzel | 174/28 |
| 4,108,476 | 8/1978 | Krup | 285/47 |
| 4,122,298 | 10/1978 | Brandt | 174/28 |
| 4,135,401 | 1/1979 | Le Breton | 138/113 |
| 4,219,224 | 8/1980 | Hanley | 138/113 |
| 4,223,702 | 9/1980 | Cook | 138/106 |
| 4,301,838 | 11/1981 | Bignell | 138/112 |
| 4,437,679 | 3/1984 | Campagnolo | 138/DIG. 11 |
| 4,521,037 | 6/1985 | Knox | 285/15 |
| 4,529,009 | 7/1985 | Horner et al. | 138/111 |
| 4,560,188 | 12/1985 | Berti et al. | 285/47 |
| 4,667,505 | 5/1987 | Sharp | 73/40.5 |
| 4,691,741 | 9/1987 | Affa et al. | 138/113 |
| 4,694,865 | 9/1987 | Tauschmann | 138/148 |
| 4,751,945 | 6/1988 | Williams | 138/117 |
| 4,779,652 | 10/1988 | Sweeney | 138/113 |
| 4,786,088 | 11/1988 | Ziu | 285/138 |
| 4,804,158 | 2/1989 | Collins et al. | 248/74.4 |
| 4,805,444 | 2/1989 | Webb | 73/40.5 |
| 4,806,705 | 2/1989 | Chen | 174/135 |
| 4,886,305 | 12/1989 | Martin | 285/133.1 |
| 4,930,544 | 6/1990 | Ziu | 138/113 |
| 5,018,260 | 5/1991 | Ziu | 24/555 |
| 5,085,471 | 2/1992 | Ziu | 285/133.1 |
| 5,186,502 | 2/1993 | Martin | 138/113 |
| 5,197,518 | 3/1993 | Fiu | 138/113 |
| 5,277,242 | 1/1994 | Arrington | 138/113 |
| 5,384,352 | 1/1995 | Ciez et al. | 285/136 |
| 5,433,252 | 7/1995 | Wolf et al. | 138/114 |

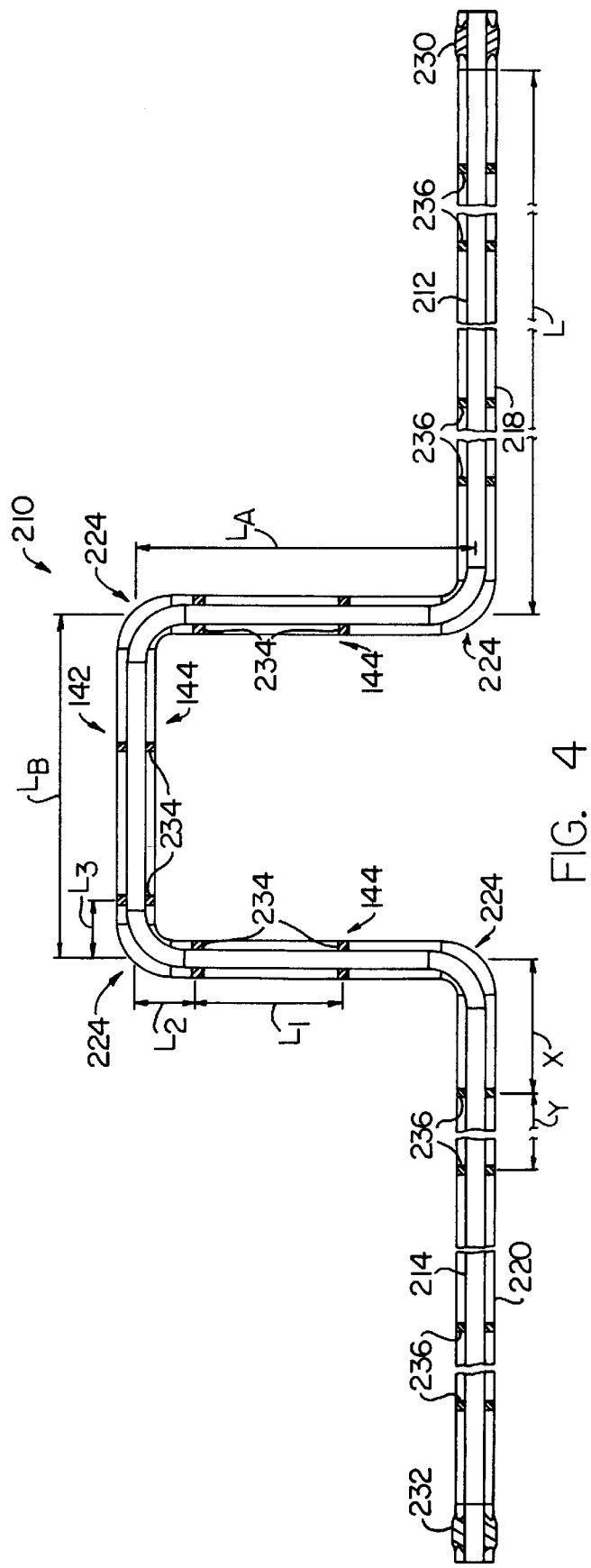
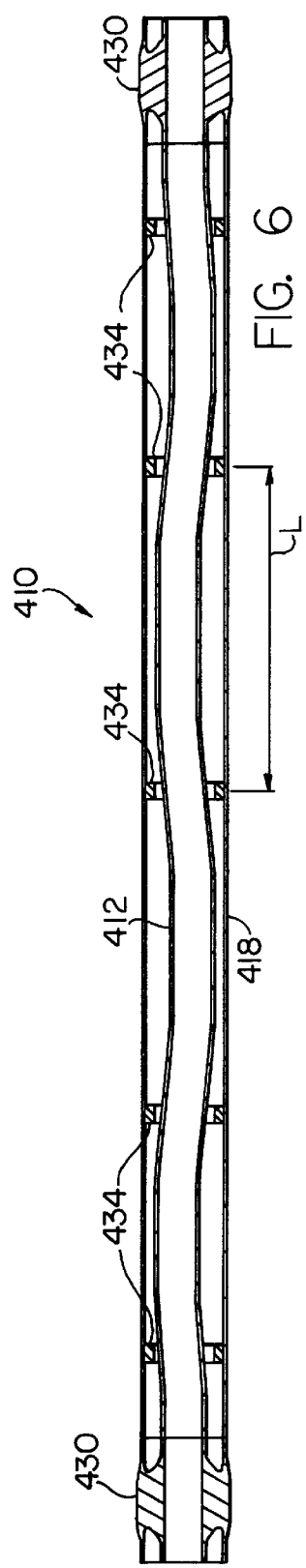

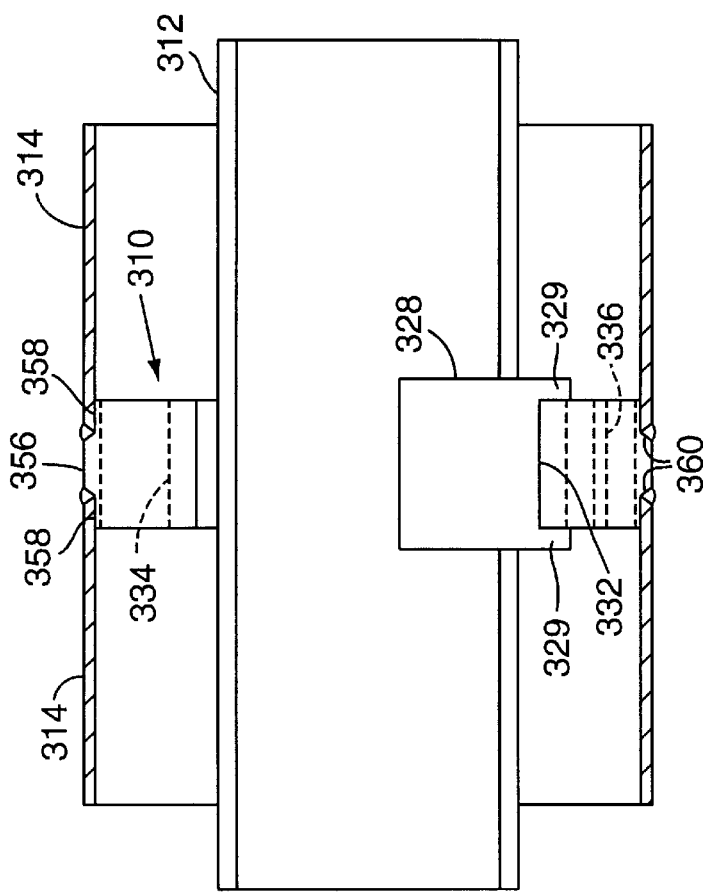
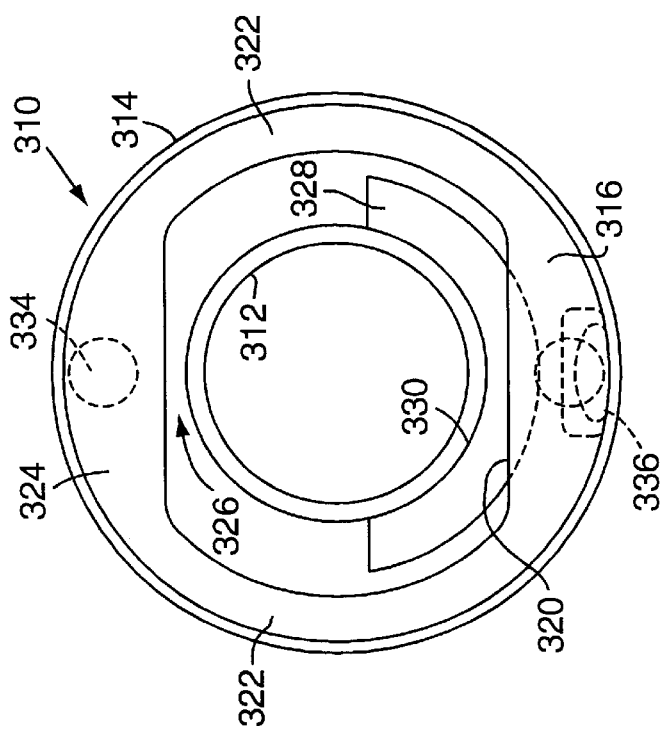
FIG. 14
FIG. 13

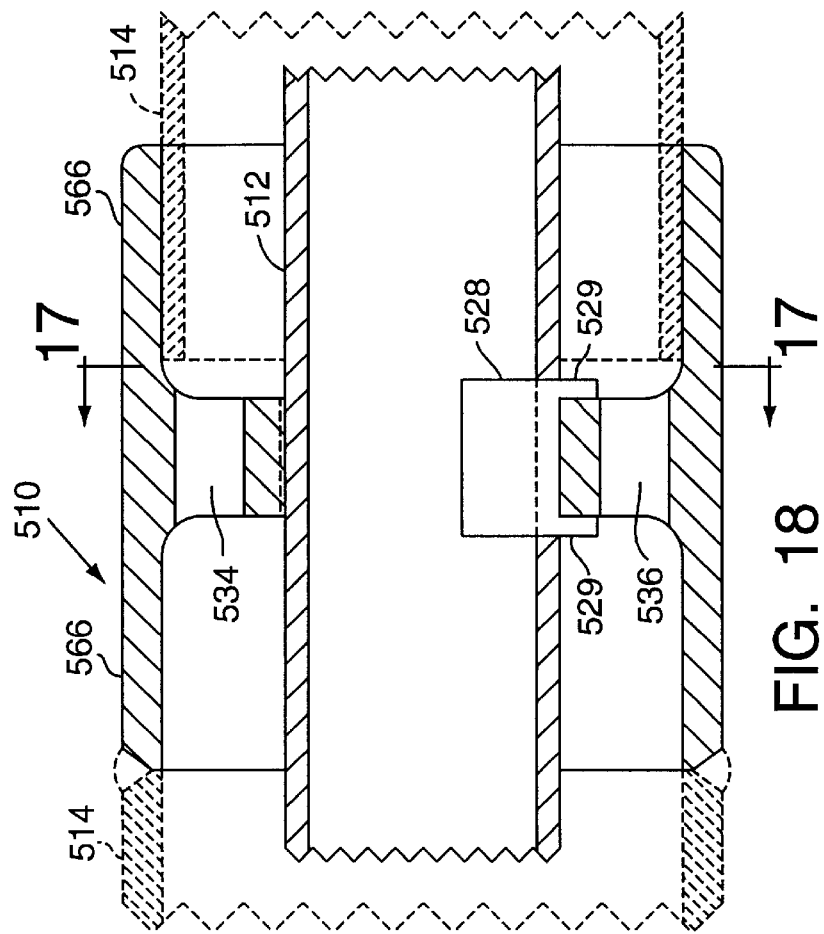
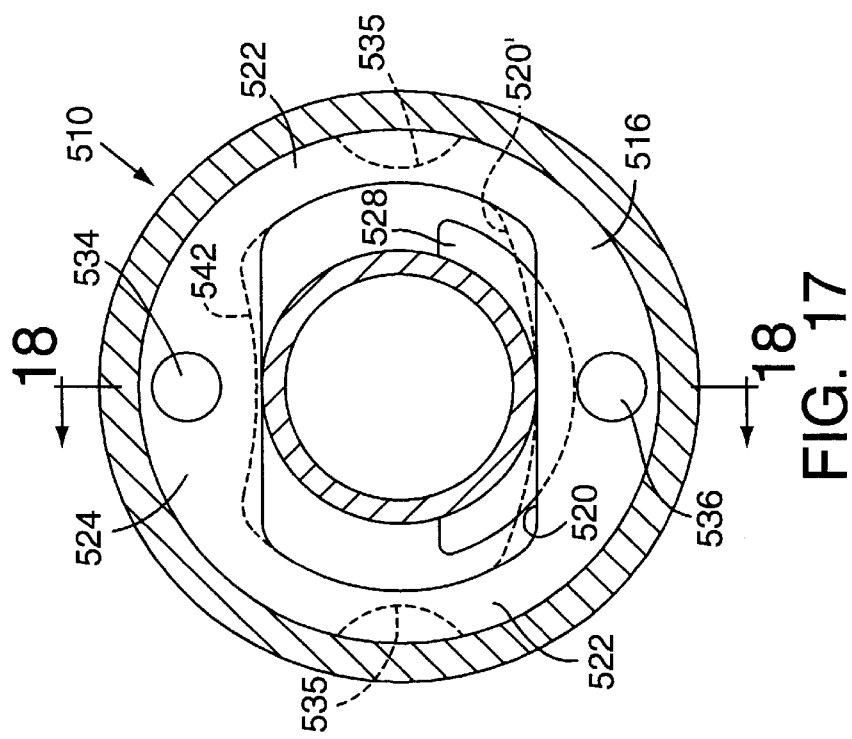
FIG. 18
FIG. 17

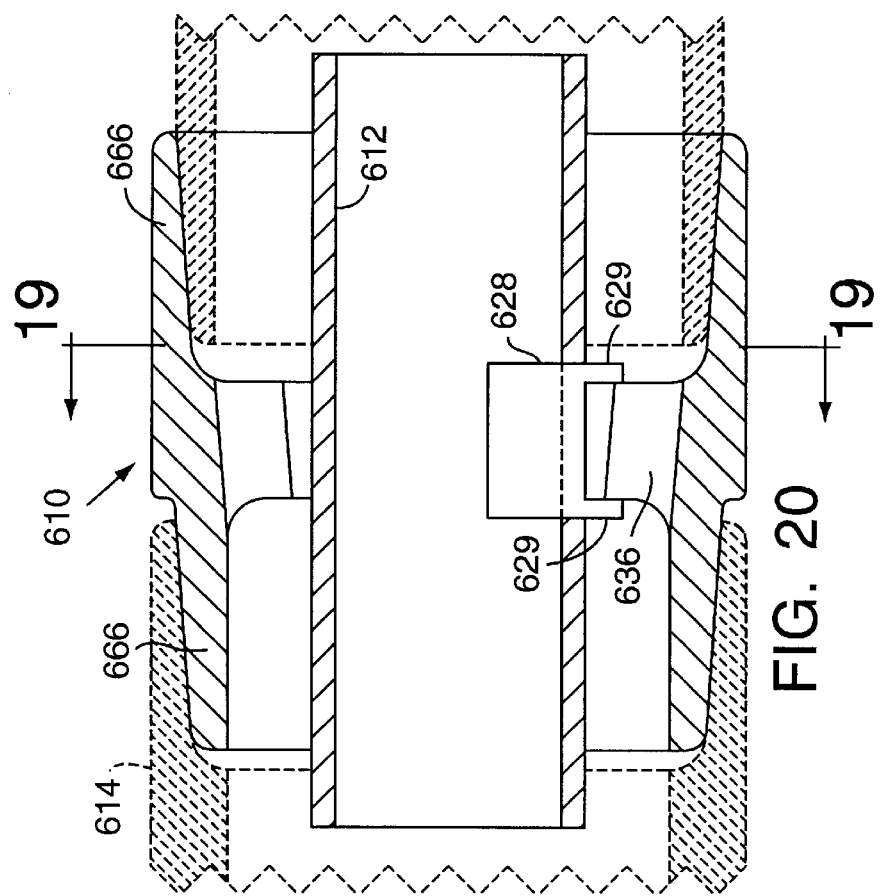
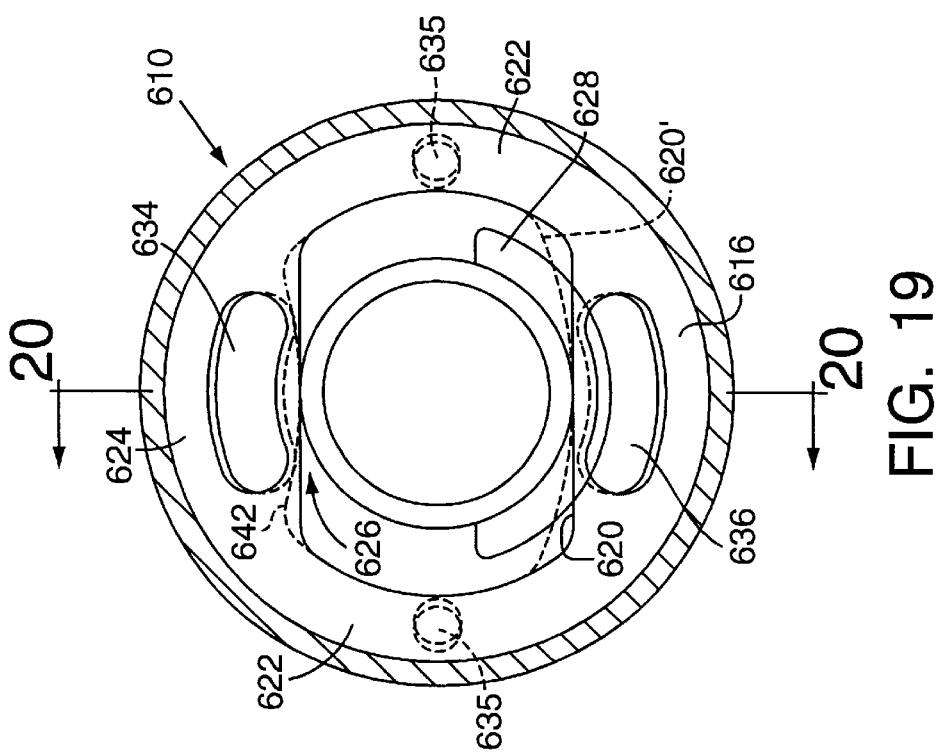

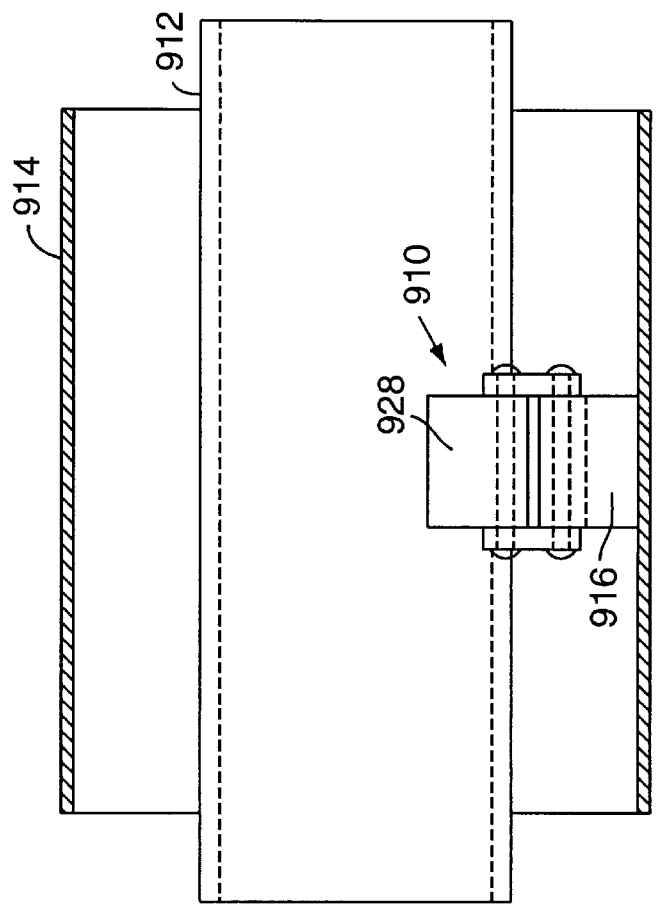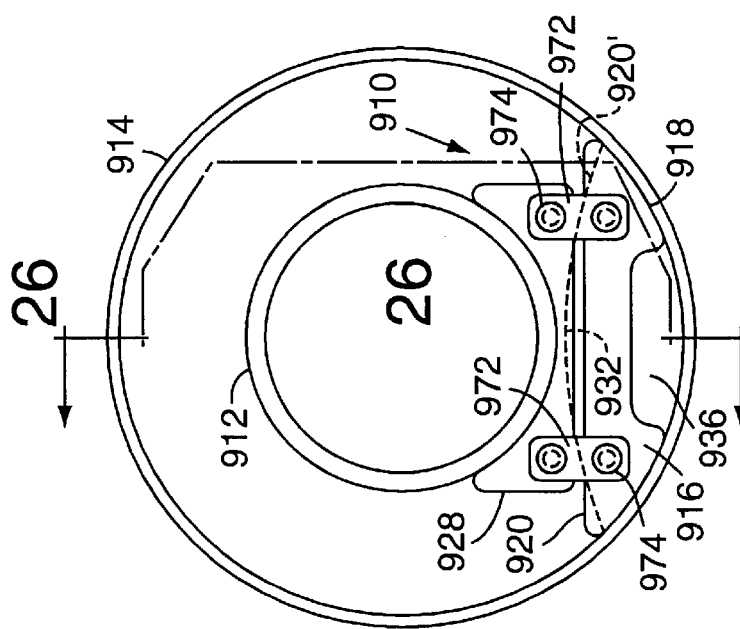

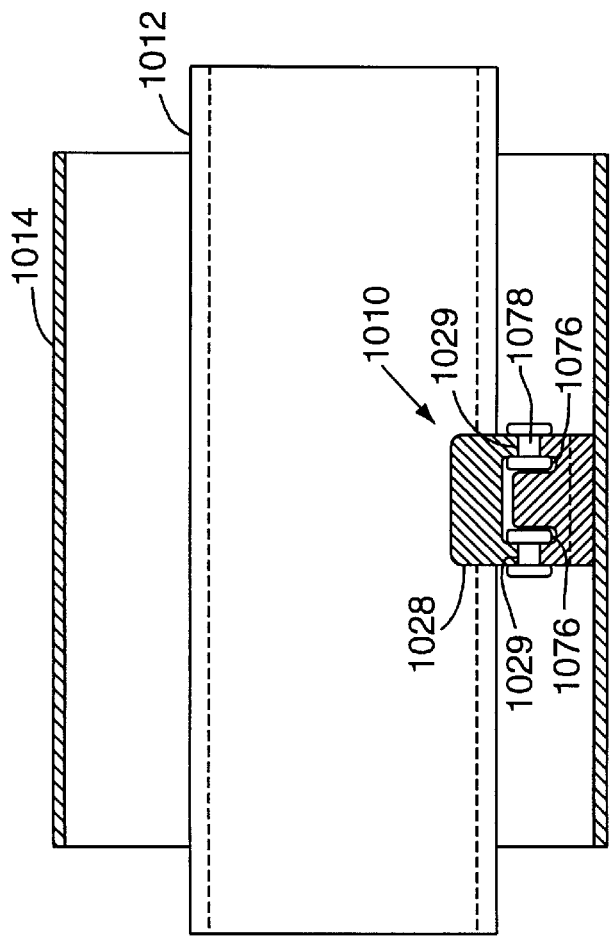
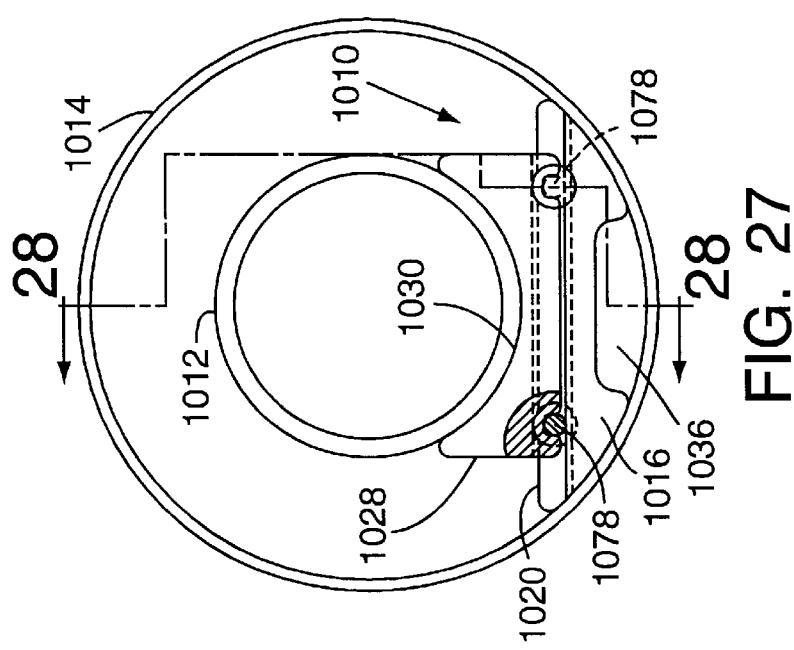

PIPE SUPPORT FOR PERMITTING LATERAL AND LONGTUDINAL MOVEMENT OF AN INNER PIPE RELATIVE TO AN OUTER PIPE IN A DOUBLE-CONTAINMENT PIPE ASSEMBLY

This patent application is a divisional of U.S. patent application Ser. No. 08/089,745, filed Jul. 9, 1993, now U.S. Pat. No. 5,482,088, which is in turn a continuation-in-part of U.S. patent application Ser. No. 08/037,083, filed Mar. 25, 1993, now abandoned.

FIELD OF THE INVENTION

The present invention relates to double-containment assemblies including inner piping or conduits located within outer piping, conduits or containment components, and more particularly, to such double-containment assemblies designed to permit movement of the inner piping components and the outer containment components relative to each other in response to events such as differential thermal expansion or contraction.

BACKGROUND INFORMATION

There are numerous systems available providing a double or dual-containment assembly including inner or primary pipes contained within outer or secondary containment pipes to transport dangerous or hazardous fluids within the inner pipes. In the event of a leak or emission of fluid or vapors from the inner pipes, the leaking substance is intended to be safely contained within the outer pipes. Historical applications for such double-containment systems are found in the nuclear, gas and petroleum refining, and chemical processing industries. It is also known to provide certain types of detectors and/or drainage devices in the annulus between the inner and outer piping components in the event that there is leakage, for the detection and/or collection of such leakage.

Differential thermal expansion in double-containment systems occurs when the inner and outer piping components expand or contract to different degrees, or at different rates relative to each other. Almost all double-containment systems are subject to changes in temperature during operation, and/or to differences in operating temperature between the inner and outer piping components. This causes differential thermal expansion or contraction of the inner and outer piping components relative to each other, thus causing the inner and outer piping components to move relative to each other.

When the inner piping components expand or contract relative to the outer piping components, and if the inner piping components are installed in an axially unrestrained manner, the deflection of the primary piping due to the expansion or contraction of the primary piping accumulates at the elbow sections of the primary piping. In this case, the inner elbow sections are subjected to bending and/or torsional movements relative to the outer elbow sections. Although elbow fittings by their nature are capable of greater flexibility than comparable straight sections of pipe, when elbow sections are subjected to bending and/or torsional movements, stresses are intensified, and in some instances, this intensification can lead to failure.

In many known double-containment systems, the inner piping components are not permitted to bend or otherwise move either laterally and/or axially relative to the outer piping components, particularly in the area of the elbows. Rather, the straight sections of inner piping are restrained by interstitial supports or other types of fittings within the outer piping components, and/or the inner elbow sections are restrained by fittings relative to the outer elbow sections or are attached to the outer elbow sections, preventing movement of the inner and outer elbow sections relative to each other.

In some known double-containment systems, the inner piping components may be able to move axially relative to the outer piping components, but the elbow fittings do not permit movement of the inner elbow sections relative to the outer elbow sections. The elbow sections become points of restraint, which can lead to failure when there is differential thermal expansion or contraction.

In other known double-containment systems, the inner piping components may be able to move relative to the outer piping components, but only within narrow limits, and once these narrow limits are exceeded, the inner piping components come into contact with the outer piping components. This is frequently the case when standard or off-the-shelf short-radius/short-radius combinations of elbow fittings are employed to make double-containment elbow fittings, which has been a common practise to date in the double-containment industry. Because the centerline radius of the inner elbow section is less than the centerline radius of the outer elbow section, there is less space between the larger-radius surfaces than between the smaller-radius surfaces within the annulus between the inner and outer elbow sections. As a result, when the most common types of differential thermal expansion or contraction occur, i. e., when the inner piping expands toward the outer piping or when the outer piping contracts toward the inner piping, there is contact between the inner and outer piping components. The elbow fittings are therefore not permitted to fully bend or flex in response to differential thermal expansion or contraction, but rather essentially behave as internal anchors, and become points of restraint, which frequently leads to premature failure.

It is typically necessary in double-containment piping systems to provide support for the primary piping by positioning one or more interstitial supports between the primary and outer containment sections of straight pipe, thus employing the structural integrity of the outer containment piping to support the primary piping through such interstitial supports. Typically, multiple interstitial supports are used, and the spacing between the interstitial supports is selected based on the longest span of primary piping that can be allowed before the primary piping sags or deflects beyond a maximum allowable deflection. The degree of deflection of the primary piping depends upon the weight of the primary piping, the weight of the fluid transported through the primary piping, the internal pressure and temperature of the primary piping, the material of construction of the primary piping, and the amount of temperature change experienced during operation of the primary piping. The temperature change is determined based on the temperature condition of the double-containment pipe assembly at the completion of construction in comparison to the high or low temperatures that it will experience when in service.

As described above, almost all chemical and petroleum product piping systems are subject to changes in temperature during operation, and during such temperature changes, there can be relatively substantial expansion and/or contraction of the primary piping relative to the outer containment piping causing the inner piping to move axially, radially and/or laterally relative to the outer containment piping. Typically, the interstitial supports in known double-containment systems do not accommodate for such relative movements, or the selection and/or location of such interstitial supports within the double-containment systems does not adequately compensate for such relative movements. As a result, significant stress is induced within such double-containment systems, which frequently can lead to a rupture or other failure of the primary piping or outer containment piping.

Accordingly, in double-containment systems developed to date, there has been insufficient means (and in many instances no means) for accommodating or alleviating differential thermal expansion and/or contraction of the inner and outer piping components relative to each other, and as a result, such systems have operated as restrained systems, developing large axial stresses, which can lead to failure, and leakage of hazardous fluids or vapors.

SUMMARY OF THE INVENTION

The present invention is directed to a double-containment assembly, comprising a first anchor support, and at least one elbow fitting including an inner elbow section contained within an outer elbow section, and defining an unobstructed annulus between the inner and outer elbow sections permitting movement of the inner elbow section relative to the outer elbow section. A first inner pipe section is coupled between the first anchor support and the inner elbow section, and a first outer pipe section is coupled between the first anchor support and the outer elbow section. A first axial-guiding support is spaced a first predetermined distance from the at least one elbow fitting for supporting the first inner pipe section within the first outer pipe section, and includes means for permitting axial movement of the first inner pipe section and first outer pipe section relative to each other, and for substantially preventing lateral movement of the first inner pipe section relative to the first outer pipe section. A first flexibility support is spaced a second predetermined distance from the elbow fitting less than the first predetermined distance, for supporting the first inner pipe section within the first outer pipe section, and includes means for permitting axial and lateral movement of the first inner pipe section relative to the first outer pipe section.

In one embodiment of the present invention, the double-containment assembly further comprises a second anchor support, and a second inner pipe section coupled between the second anchor support and the inner elbow section on the opposite side of the inner elbow section relative to the first inner pipe section. A second outer pipe section is coupled between the second anchor support and the outer elbow section on the opposite side of the outer elbow section relative to the first outer pipe section. A second axial-guiding support is spaced a third predetermined distance from the elbow fitting for supporting the second inner pipe section within the second outer pipe section, and includes means for permitting axial movement of the second inner pipe section and second outer pipe section relative to each other, and for substantially preventing lateral movement of the second inner pipe section relative to the second outer pipe section. A second flexibility support is spaced a fourth predetermined distance measured from the elbow fitting, which is less than the third predetermined distance, for supporting the second inner pipe section within the second outer pipe section, and includes means for permitting axial and lateral movement of the second inner pipe section relative to the second outer pipe section.

The present invention is also directed to a method of assembling a double-containment assembly, comprising the steps of: a) selecting the location of a first anchor support relative to a first elbow fitting, and coupling first inner and outer pipe sections between the first anchor support and corresponding first inner and outer elbow sections of the first elbow fitting; b) coupling second inner and outer pipe sections to the other side of each inner and outer elbow section; c) determining an expected overall change in linear dimension due to temperature changes for i) the first inner and outer pipe sections, and ii) the second inner and outer pipe sections; d) comparing the expected overall change in linear dimension for each of the first inner and outer pipe sections, and second inner and outer pipe sections to the distance in the axial directions of each of the first and second pipe sections between the inner and outer elbow sections; and e) selecting an elbow fitting with sufficient space between the inner and outer elbow sections in the axial direction of either the first or second pipe sections to accommodate the expected change in linear dimension of each pipe section.

One embodiment of the present invention further comprises the steps of determining a first minimum distance of a first axial-guiding support mounted between the first inner and outer pipe sections from the elbow fitting, wherein the first minimum distance is based on the expected overall change in linear dimension due to temperature changes of the second inner and outer pipe sections, and installing the first axial-guiding support at a location greater or equal to the first minimum distance if the distance between the elbow fitting and the first anchor support is greater than the first minimum distance.

Preferably, the method of the present invention further comprises the step of mounting a first flexibility support between the first inner and outer pipe sections a second minimum distance from the elbow fitting, wherein the second minimum distance is less than the first minimum distance.

One advantage of the present invention, is that any differential thermal expansion or contraction of the inner piping components and outer piping components relative to each other accumulates at the elbow fitting between the internal anchors. The elbow fitting absorbs the differential thermal expansion or contraction by movement of the inner elbow section and outer elbow section relative to each other, without contacting each other. The flexibility supports are mounted adjacent to the elbow fittings to permit axial, lateral, and if necessary, radial movements of the inner piping relative to the outer piping in the areas of the elbows. The axial-guiding supports permit only axial movement of the inner piping relative to the outer piping to substantially concentrically guide the inner piping through the outer piping, and ensure that the distortion of the inner piping remains within design limits. Each of the piping components in the assembly of the present invention, is thus selected and located to accommodate differential thermal expansion or contraction of the inner and outer piping components relative to each other, without permitting the inner and outer piping to contact each other, which can lead to failures normally associated with prior double-containment assemblies.

Other advantages of the present invention will become apparent in view of the following detailed description and accompanying drawings.

BRIEF DESCRIPTION OF THE DRAWINGS

FIG. 1A is a plan view of a typical centering or flexibility support employed in the double-containment assembly of FIG. 1.

FIG. 1B is a plan view of a typical axial-guiding support employed in the double-containment assembly of FIG. 1.

FIG. 4 is a partial schematic, cross-sectional view of another embodiment of a double-containment assembly of the present invention including an expansion loop.

FIG. 6 is a partial schematic, cross-sectional view of another embodiment of a double-containment assembly of the present invention including only straight sections of piping coupled between intermediate anchors.

FIG. 13 is an end plan view of another embodiment of a centering support assembly of the present invention, in which the assembly functions both as a centering support and as a coupling between sections of outer pipe.

FIG. 14 is a partial cross-sectional view of the centering support assembly of FIG. 13.

FIG. 17 is a cross-sectional view of another embodiment of a centering support assembly of the present invention taken along the line 17—17 of FIG. 18, in which the support functions both as a centering support for the primary pipe within the outer pipe, and also as a coupling for the sections of outer pipe, and includes annular flanges for nested engagement and/or abutting engagement with sections of outer pipe.

FIG. 18 is a cross-sectional view of the centering support assembly of FIG. 17 taken along the line 18—18 of FIG. 17.

FIG. 19 is a cross-sectional view of another embodiment of a centering support assembly of the present invention taken along line 19—19 of FIG. 20, including tapered annular flanges for nested engagement with sections of outer pipe.

FIG. 20 is a cross-sectional view of the centering support assembly of FIG. 13 taken along the line 20—20 of FIG. 19.

FIG. 25 is an end plan view of another embodiment of a centering support assembly of the present invention, including hinged members coupled between the saddle and the base to permit lateral movement of the primary pipe relative to the outer pipe.

FIG. 26 is a partial cross-sectional view of the centering support assembly of FIG. 25 taken along the line 26—26 of FIG. 25.

FIG. 27 is an end view, in partial cross section of another embodiment of a centering support assembly of the present invention, in which the saddle is mounted by roller bearings on the base to permit lateral movement of the saddle and primary pipe relative to the outer pipe.

FIG. 28 is a partial cross-sectional view of the centering support assembly of FIG. 27 taken along the line 28—28 of FIG. 27.

DETAILED DESCRIPTION

Figure 1:
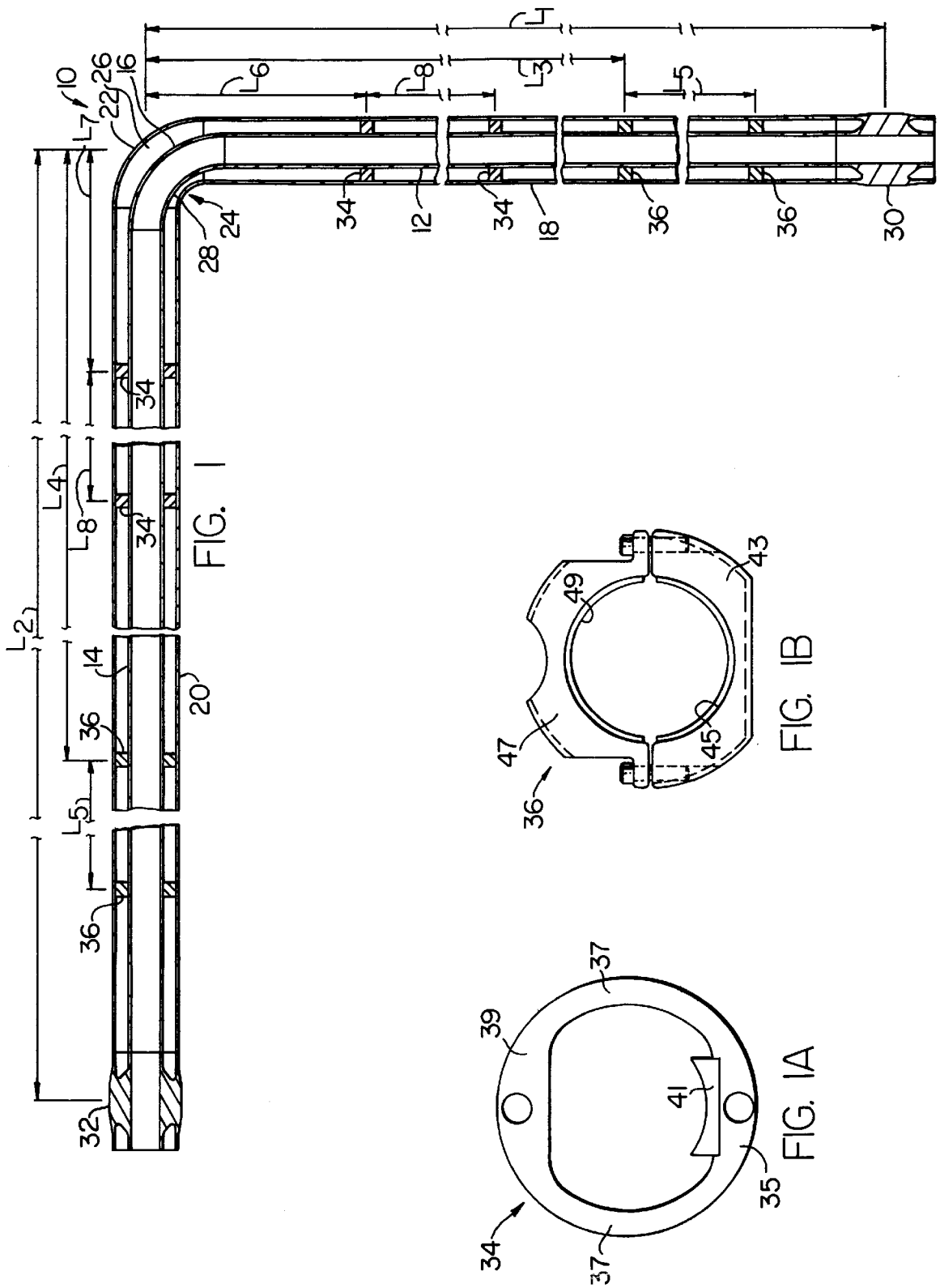
FIG. 1 is a partial schematic, cross-sectional view a double-containment assembly embodying the present invention.

In FIG. 1, a double-containment assembly embodying the present invention is indicated generally by the reference numeral 10. The double-containment assembly 10 comprises a plurality of sections of inner or primary pipe contained within outer secondary or containment pipe, including a first section of inner pipe 12 coupled to a second section of inner pipe 14 by an inner elbow section 16. The first inner pipe section 12 is contained within a first outer pipe section 18, and the second inner pipe section 14 is contained within a second outer pipe section 20. The outer pipe sections 18 and 20 are coupled together by an outer elbow section 22 containing the inner elbow section 16, and forming an elbow fitting indicated generally by the reference numeral 24.

The elbow fitting 24 is preferably of the type disclosed in the co-pending U.S. patent application filed on the same date as the present patent application in the name of Christopher G. Ziu, entitled "Elbow Fittings With Expanded Outer Annulus Space For Double-Containment Assemblies", filed Jul. 9, 1993 and accorded Ser. No. 08/089,798, now U.S.

Pat. No. 5,442,922, which is hereby expressly incorporated by reference as part of the present disclosure. As can be seen in FIG. 1, there is a larger distance between the larger-radius surfaces than between the smaller-radius surfaces of the inner elbow section 16 and the outer elbow section 22, defining an expanded or relatively wide outer annulus space 26 in comparison to a more narrow inner annulus space 28. In most instances of differential thermal expansion or contraction of the inner and outer piping components relative to each other, the inner piping components expand and in turn cause the inner elbow section to move outward toward the outer elbow section, or the outer piping components contract and in turn cause the outer elbow section to move inward toward the inner elbow section. In either case, the relative movement of the inner and outer piping components occurs within the outer annulus space, and the relatively wide outer annulus space 26 is sufficient to accommodate such movement without permitting the inner and outer elbow sections to contact each other, and possibly lead to failure, as is often the case with prior double-containment assemblies.

Other types of elbow fittings may also be used in the double-containment assemblies of the present invention; for example, the elbow fittings described in co-pending patent U.S. application Ser. No. 07/859,278, filed Mar. 26, 1992, entitled "Elbow Fittings For Double Containment Pipe Assemblies", which is a continuation of U.S. application Ser. No. 07/681,324, filed Apr. 4, 1991, now abandoned, and which is hereby expressly incorporated by reference as part of the present disclosure. These elbow fittings also suitably permit movement of the inner piping and inner elbow section and the outer piping and outer elbow section relative to each other to accommodate differential thermal expansion or contraction. In these fittings, the curved portion of the inner elbow section is concentric with the curved portion of the outer elbow section, defining a substantially uniform and unobstructed space throughout the annulus between the inner and outer elbow sections to permit the necessary movement of the inner and outer elbow sections relative to each other in response to differential thermal expansion or contraction.

The first inner pipe section 12 and first outer pipe section 18 are each coupled on the end opposite the elbow fitting 24 to an intermediate internal anchor, which in this embodiment of the present invention is a first termination fitting 30. Similarly, the second inner pipe section 14 and second outer pipe section 20 are each coupled on the end opposite the elbow fitting 24 to a second termination fitting 32. The termination fittings 30 and 32 each act as an internal anchor, preventing movement of the inner and outer piping components relative to each other in the direction of the respective termination fitting. Thus, any expansion or contraction of the first and second inner and outer pipe sections is permitted to occur between the first and second termination fittings 30 and 32, respectively. Accordingly, if either the first or second inner pipe sections 12 or 14 undergo expansion, the growth of the inner pipes accumulates at the elbow fitting 24, and is absorbed at the elbow fittings by movement of the inner elbow section 16 outward toward the outer elbow section 22 within the expanded outer annulus space 26. Similarly, if there is contraction of the outer piping components relative to the inner piping components, the decrease in length of the outer piping is absorbed by the elbow fitting 24, by movement of the outer elbow section 22 inward toward the inner elbow section 28 within the outer annulus space 26. As shown in FIG. 1, the termination fittings 30 and 32 each terminate the annulus space between the respective inner and outer piping components by means of a solid annulus portion located between the inner and outer flanges of the fitting. In many instances, however, flow passages are formed through the annulus portion to permit the flow of fluid or vapors through the fittings into an annulus on the other side of each fitting.

The internal anchors 30 are preferably of the type disclosed in U.S. Pat. No. 5,141,261, dated Aug. 25, 1992, entitled "Double Containment Pipe Joint Assembly", which is hereby expressly incorporated by reference as part of the present disclosure. Another type of intermediate anchor that may equally be employed as the fittings 30 and/or 32 is disclosed in U.S. Pat. No. 5,085,471, dated Feb. 4, 1992, entitled "Double Containment Pipe Joint Assembly", which is also hereby expressly incorporated by reference as part of the present disclosure. Many of these preferred internal anchors are not termination fittings, but rather include flow passages for the flow of fluid within the annulus through the fittings.

The double-containment assembly 10 also includes a plurality of centering or flexibility supports 34 supporting the first inner pipe section 12 within the first outer pipe section 18 and the second inner pipe section 14 within the second outer pipe section 20. The first flexibility support 34 on each side of the elbow fitting 24 is spaced a predetermined distance away from the elbow fitting, and the successive flexibility supports 34 are substantially equally spaced a predetermined distance relative to each other on the other side of the first flexibility support relative to the elbow fitting 24. The flexibility supports 34 permit axial, lateral, and if necessary, they can be designed to permit radial movement of the inner piping components relative to the outer piping components. This ability to permit relative movement of the inner piping components in both the lateral and axial directions (and if necessary, in radial directions) is particularly advantageous in the areas adjacent to the elbow fittings to adequately accommodate differential thermal expansion and contraction of the inner and outer piping components relative to each other.

The flexibility supports 34 are preferably of the type described in further detail below and disclosed in co-pending patent application Ser. No. 07/722,083, filed Jun. 27, 1991, now U.S. Pat. No. 5,197,518, dated Mar. 30, 1993, entitled "Centering Support Assembly For Double Containment Pipe Systems", and U.S. patent application Ser. No. 08/037,083, filed Mar. 25, 1993, entitled "Centering Support Assembly For Double Containment Pipe Systems", which is a continuation-in-part of patent application Ser. No. 07/722, 083, now U.S. Pat. No. 5,197,518, which are each hereby expressly incorporated by reference as part of the present disclosure.

A typical flexibility support 34 is illustrated in FIG. 1A, and includes a base portion 35, a pair of stanchion portions 37 formed on either side of the base portion 35, and a cross-piece portion 39 extending between the other ends of the stanchion portions 37. A saddle portion 41 is mounted on the base portion 35, and defines a curved surface for seating the inner piping 12 or 14. The saddle portion 41 is movable relative to the base portion 35 between the stanchion portions 37 to permit lateral movement of the inner piping relative to the outer piping. If necessary, the cross-piece portion 39 is spaced above the inner piping a distance sufficient to permit radial movement of the inner piping relative to the outer piping. In other instances, the cross-piece portion 39 is spaced closely to the inner piping to prevent or permit only limited radial movement of the inner piping, which may be necessary to control buckling of the inner piping during operation of the double-containment assembly. This embodiment of the flexibility support 34 is only exemplary, however, and as is made evident in the above-described patent applications, and described in detail below there are numerous other embodiments of flexibility supports that can adequately permit axial, lateral, and if necessary, radial movements of the inner piping components relative to the outer piping components in the double-containment assemblies of the present invention.

Beyond a predetermined distance from the elbow fittings, such as the elbow fitting 24, the use of the flexibility supports 34 may have only minimal effect, and beyond this distance, axial-guiding interstitial supports 36 which restrict lateral movement of the inner piping and function as axial guides are used instead. The axial-guiding supports 36 are spaced a predetermined distance relative to each other, and are preferably equally spaced from the first axial-guiding support relative to the elbow fitting to the respective intermediate anchor 30 or 32, as is described further below.

The axial-guiding supports 34 are preferably of the type disclosed in co-pending U.S. patent application Ser. No. 07/885,670, filed Aug. 17, 1992, entitled "Centering Support For Double-Containment Pipe Assembly", now U.S. Pat. No. 5,404,914, and which is hereby expressly incorporated by reference as part of the present disclosure. A typical axial-guiding support 36 is illustrated in FIG. 1B, and includes a base portion 43 defining a first curved surface 45 for seating the inner piping 12 or 14, and a clamp portion 47 defining a second curved surface 49 for engagement with the substantially opposite side of the inner piping relative to the first curved surface 45. As shown in FIG. 1B, the axial-guiding support 36 includes a pair of fasteners for attaching the clamp portion 47 to the base portion 45 to fix the support to the inner piping.

Each axial-guiding support 36 is moveable relative to the outer piping to permit axial movement of the inner piping relative to the outer piping. However, because each axial-guiding support 36 is secured to the inner piping, and extends between the inner piping and the outer piping, the support prevents lateral and/or radial movement of the inner piping relative to the outer piping in the area of the respective support. As shown in FIG. 1B, the axial-guiding support 36 includes a semi-circular cutout in the clamp portion 47, and a flat chord cut in the base portion 45 to permit fluid flow, if necessary, through the annulus between the inner and outer piping. Each axial-guiding support 36 may also include a layer of elastomeric material between each of the curved surfaces 45 and 49 and the inner piping to facilitate in dampening any vibrational movements of the inner piping.

Other types of axial-guiding supports that may be employed as the supports 36 are disclosed in co-pending U.S. patent application Ser. No. 08/088,864, now U.S. Pat. No. 5,400,828, entitled "Double-Containment Piping Supports For Improved Annulus Flow", filed on Jul. 8, 1993, which is also hereby expressly incorporated by reference as part of the present disclosure.

These types of axial-guiding supports are only exemplary, and as is evident in the above-identified patent applications, there are numerous embodiments of axial-guiding supports that permit axial movement of the inner and outer piping components relative to each other, but prevent lateral and/or radial movements of the inner piping relative to the outer piping, which may be employed in the double-containment assemblies of the present invention.

Figure 2:
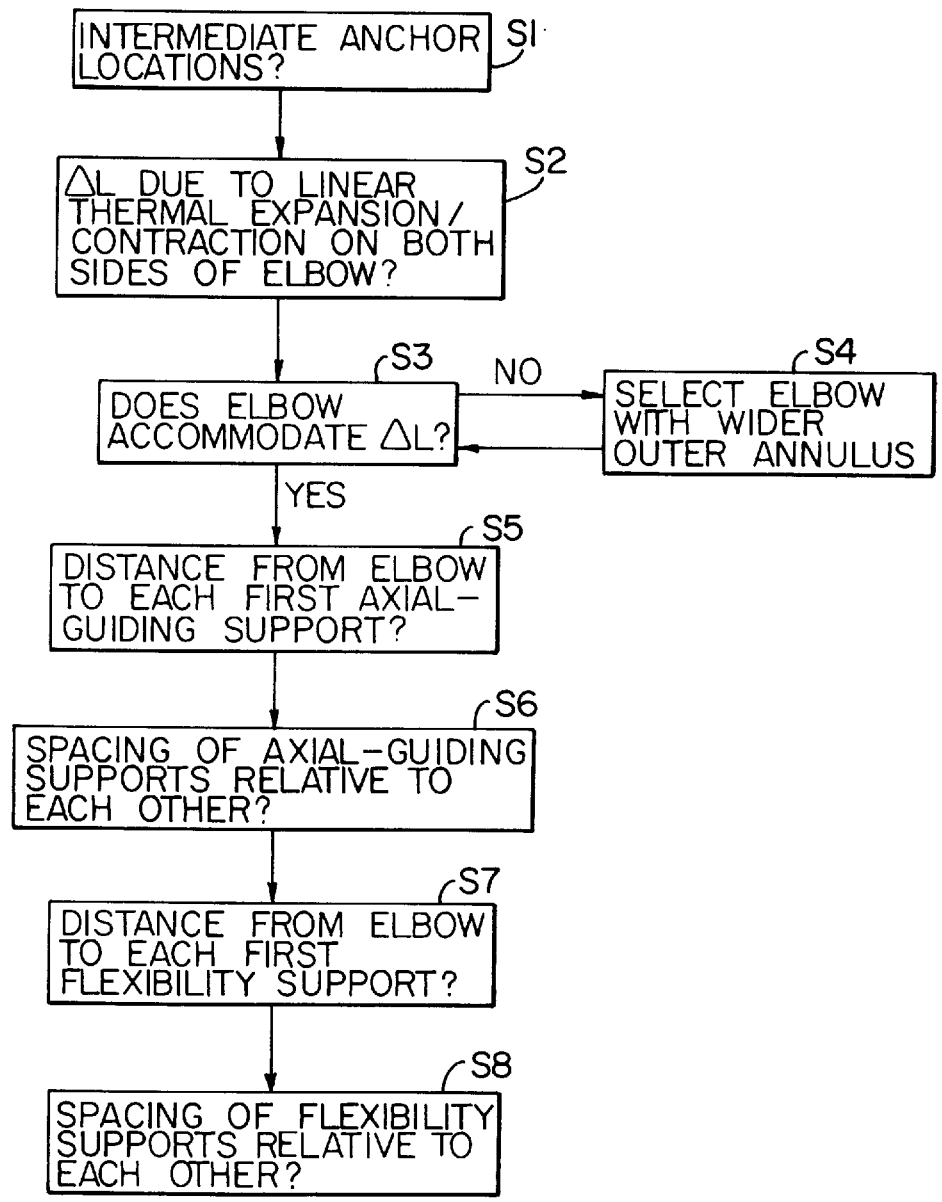
FIG. 2 is a flow chart illustrating conceptually the procedural steps for constructing a double-containment assembly in accordance with the present invention.

In FIG. 2, a flow chart illustrates conceptually the procedural steps in constructing the double-containment assemblies in accordance with the present invention. The first step is to determine the locations of the intermediate anchors, which in FIG. 1 are the termination fittings 30 and 32, as indicated as S1 in FIG. 2. Typically, the intermediate anchors are located approximately at the mid-point of each respective straight section of piping, or half-way between elbow fittings, or other directional changes in the double-containment assembly. This may not always be the case, however, depending upon any unusual requirements of a particular system. As shown in FIG. 1, the first termination fitting 30 is located a distance L1 from the centerline of the second inner and outer pipe sections 14 and 20, and the second termination fitting 32 is located a distance L2 from the centerline of the first inner and outer pipe sections 12 and 18.

Once the intermediate anchor locations are selected (L1 and L2), this is the starting point for determining the locations of the interstitial supports within the double-containment assembly. The next step is to determine the expected overall changes in dimension due to thermal expansion or contraction of the straight sections (or legs) on either side of the elbow fitting, as indicated by S2 in FIG. 2. The expected change in linear dimension of each respective straight pipe section is determined based on the following equation:

$$\Delta L = C \times \Delta T \times L \quad (1)$$

wherein $\Delta L$ is the expected change in linear dimension of the respective inner or outer straight section of pipe;

C is the coefficient of thermal expansion of the respective inner or outer section of pipe, which is based on the material of construction of the pipe;

$\Delta T$ is the expected change in temperature of each respective section of pipe during operation of the double-containment assembly 10; and L is the length of the respective straight section of inner or outer pipe, i.e., the distance from the face of the intermediate anchor 30 or 32 to the centerline of the inner and outer straight sections on the other side of the elbow fitting.

The expected change in temperature ($\Delta T$) for each inner section of pipe is typically based on the expected change in temperature of the fluid passed through the inner pipe, or the change in temperature when fluid is being transported within the inner piping as compared to the temperature of the system at installation and/or when fluid is not being transported. With respect to the outer sections of piping, the expected change in temperature ($\Delta T$) is typically based on the expected change in the surrounding or ambient temperature of the outer piping from the installation temperature, which is subject to greater fluctuations in aboveground, outdoor systems, as opposed to underground systems.

For aboveground systems, in which the outer piping is not restrained relative to the inner piping, the overall change in linear dimension ($\Delta L$) for each leg of the double-containment assembly is determined by separately calculating the change in linear dimension of the respective inner straight pipe section, and the change in linear dimension of the respective outer straight pipe section in accordance with equation (1) above, and the difference between the two is the overall change in linear dimension of that leg ($\Delta L$).

For underground systems, in which the outer piping components are restrained relative to the inner piping components, or aboveground systems in which the outer piping components are restrained relative to the inner piping components, the change in linear dimension of the outer piping sections due to thermal expansion or contraction is de minimis, if not zero. Therefore, in these systems, the overall change in linear dimension (ΔL) for each leg of the double-containment assembly is calculated using equation (1) above for only the inner piping sections.

Once ΔL is determined for each leg of the double-containment assembly, the next step is to determine whether there is sufficient space provided in the outer annulus 26 of the elbow fitting 24 to accommodate the expected overall thermal expansion or contraction of each leg coupled to the elbow fitting, as indicated by S3 in FIG. 2. In other words, the overall change in linear dimension (ΔL) for each of the straight pipe sections must be less than the space provided in the outer annulus 26 in the axial direction of the piping in order to accommodate such thermal expansion or contraction, without permitting the inner and outer elbow sections to contact each other, which could lead to a rupture in the piping. If the outer annulus space 26 is insufficient to accommodate the expected overall thermal expansion or contraction (ΔL), then the next step is to select a new elbow fitting 24 which provides a sufficiently wide outer annulus space 26 to accommodate the overall ΔL, as indicated by S4.

The next step is to determine the location of each of the first axial-guiding supports 36 with respect to the elbow fitting 24, as indicated by S5 in FIG. 2. The location of the first axial-guiding support 36 on the right side of the elbow fitting 24 in FIG. 1 is indicated as L3, which is the distance from the centerline of the inner and outer straight sections of pipe 14 and 20 to the mid-point of the respective first axial-guiding support. The location of the first axial-guiding support 36 on the left side of the elbow fitting 24 in FIG. 1 is indicated as L4, which is the distance from the centerline of the inner and outer straight sections of pipe 12 and 18 to the mid-point of the respective first axial-guiding support. The distances L3 and L4 are each determined based on the following equation:

$$L=[(\Delta L \times OD \times 10^6)/1.6S]^{1/2} \quad (2)$$

wherein L is either L3 or L4, i.e., the distance from the centerline of the straight sections of pipe on the opposite side of the elbow fitting to the mid-point of the respective axial-guiding support;

ΔL is the expected overall change in linear dimension of the inner and outer straight pipe sections on the opposite side of the elbow fitting 24, as determined above based on equation (1);

OD is the outside diameter of the inner pipe; and

S is the maximum desired stress for the elbow fitting 24. As an example, for an elbow fitting of ferrous-based material, the maximum allowable stress is within the range of approximately 10,000 to 30,000 psi.

The distances L3 and L4 determined in accordance with equation (2) above define the minimum distances from the elbow fitting at which the first axial-guiding supports 36 can be located. It may be desirable to locate each first axial-guiding support 36 at a distance greater than L3 or L4, respectively, depending upon the requirements of a particular system. For example, in order to have substantially equal spacing between the axial-guiding supports, it may be desirable to locate the first axial-guiding support at a distance greater than L3 or L4, depending upon the distance between L3 or L4 and the respective internal anchor. It is not recommended, however, to locate either of the first axial-guiding supports closer to the elbow fittings than the positions defined by the distances L3 or L4.

Once the distances L3 and L4 are determined, the next step is to determine the locations of the additional axial-guiding supports 36 between each first axial-guiding support 36 and the adjacent termination fitting 30 or 32, as indicated by S6 in FIG. 2. The additional axial-guiding supports 36 are substantially equally spaced a distance L5 relative to each other based on the following equations:

$$L=[(76.9Y \times E \times I)/W]^{1/4} \quad (3a)$$

or $$L=[(185.2Y \times E \times I)/W]^{1/4} \quad (3b)$$

or $$L=[(144.9Y \times E \times I)/W]^{1/4} \quad (3c)$$

or $$L=[(153.8Y \times E \times I)/W]^{1/4} \quad (3d)$$

wherein:

L is the spacing between adjacent axial-guiding supports (L5 in FIG. 1);

Y is the mid-span vertical displacement or sag due to the weight of the inner piping (a span is a section of pipe between supports);

E is the modulus of elasticity of the inner piping material (psi) at the maximum expected inner-piping temperature;

I is the moment of inertia of the respective inner pipe section (in$^4$); and

W is the unit weight of the inner piping when filled with the fluid that is being transported.

One of equations 3a through 3b is selected based on the number of spans within a respective straight pipe section, wherein one span is defined as one section of pipe between points of support. Equation (3a) is employed if there is only one span; equation (3b) is employed if there are two spans; equation (3c) is employed if there are three spans; and equation (3d) is employed if there are four or more spans.

The next step is to determine the location of each of the first centering or flexibility supports 34 with respect to the elbow fitting 24, as indicated by S7 in FIG. 2. The first flexibility support 34 on the right side of the elbow fitting 24 in FIG. 1 is located a distance L6 from the centerline of the straight pipe sections on the opposite side of the elbow fitting, and the first flexibility support 34 on the left side of the elbow fitting in FIG. 1 is located a distance L7 from the centerline of the straight pipe sections on the opposite side of the elbow fitting. The distances L6 and L7 are selected so that the sum of L6 and L7 (L6+L7) is less than or equal to approximately three-quarters of L5 (0.75×L5). Typically, L6 and L7 are substantially equal; however, in certain instances one may be greater than the other, depending upon the unique considerations of a particular system.

The other centering or flexibility supports 34 are substantially equally spaced relative to the first flexibility supports 34 or each other a distance L8, between each first flexibility support and the respective first axial-guiding support 36, as shown in FIG. 1 and indicated as step S8 in FIG. 2. The distance L8 is determined in accordance with equations (3a)–(3d) above, and is equal to L5.

One advantage of the double-containment assemblies constructed in accordance with the procedural steps of the present invention, is that the system is inherently flexible in order to accommodate movements of the inner and outer piping components relative to each other in response to differential thermal expansion or contraction, or other effects causing movements of the inner and outer piping components relative to each other. Each of the fittings and supports is suited to accommodate specific types of movements of the piping components relative to each other, and the location of each fitting or support is selected in order to adequately support the piping components, yet to permit movements of the inner and outer piping components relative to each other and avoid the failures normally associated with prior art, restrained double-containment systems.

The intermediate anchors control the direction of expansion or contraction of the piping components so that the changes in linear dimensions of the straight pipe sections accumulate at the elbow fittings located between the termination fittings. The elbow fittings are uniquely designed to in turn accommodate the movements of the inner and outer piping components relative to each other by permitting displacement of the inner and outer elbow sections relative to each other without contacting each other. The flexibility supports are located adjacent to the elbow sections to accommodate the greater extent of relative movements in the areas of the elbow fittings, because the flexibility supports permit axial, lateral, and if desired, radial movements of the inner piping components relative to the outer piping components, while also supporting the inner piping components within the outer piping components. The axial-guiding supports are located between the flexibility supports and the intermediate anchors to permit axial movement of the inner and outer piping components relative to each other to accommodate linear expansion or contraction of the inner and outer piping components. The axial-guiding supports also substantially prevent other movements of the inner and outer piping components relative to each other in order to guide the piping into the elbow section to ensure proper compensation.

Figure 3:
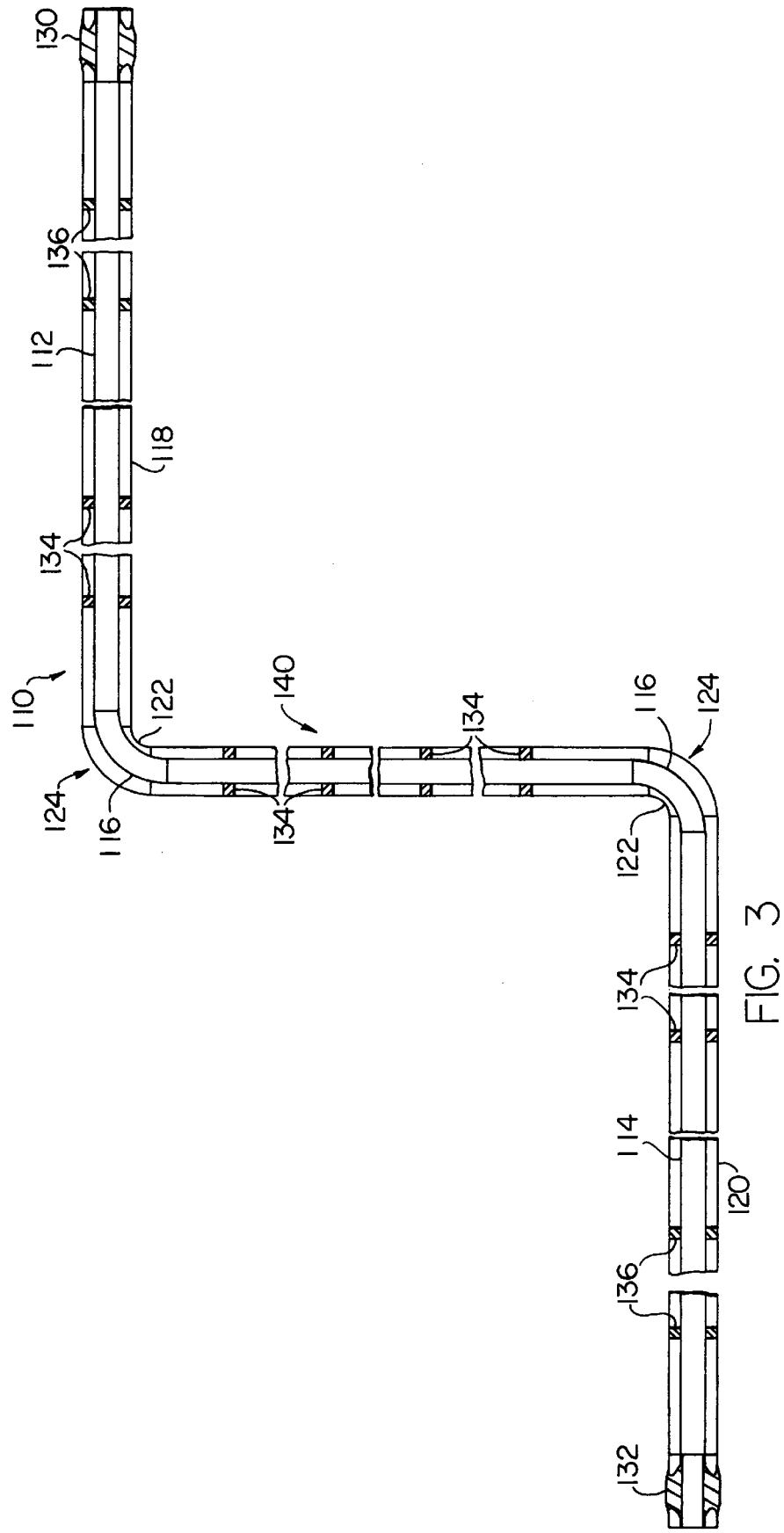
FIG. 3 is a partial schematic, cross-sectional view of another embodiment of a double-containment assembly of the present invention including an offset leg.

Turning to FIG. 3, another double-containment assembly embodying the present invention is indicated generally by the reference numeral 110. The double-containment assembly 110 includes the same components as the assembly 10 described above in connection with FIG. 1, and therefore like reference numerals preceded by the numeral 1 are used to indicate like elements. The double-containment assembly 110 is an offset assembly, including an offset leg 140 coupled between two elbow fittings 124. The offset leg 140 is a relatively short span of straight pipe, and is substantially shorter in length than either of the straight sections (or legs) located between the other side of each elbow fitting 124 and a respective termination fitting 130 or 132. Because the offset leg 140 is relatively short in length, it does not include any axial-guiding supports like the axial-guiding supports 136. Rather, the only interstitial supports located within the offset leg 140 are flexibility supports 134, permitting axial, lateral, and if desired, radial movements of the inner piping components relative to the outer piping components. Based on equation (2) above, there is insufficient distance between the two elbow fittings 124 to mount an axial-guiding support like the supports 136 between the elbow fittings.

In this type of offset embodiment of the present invention, when determining the locations of the first axial-guiding supports 136 with respect to the adjacent elbow fittings 124, equation (2) above is employed. However, the change in linear dimension (ΔL) used to determine the distance L in equation (2) is the change in linear dimension for the straight pipe section on the other side of the respective elbow fitting employing axial-guiding supports, i.e., the leg on the other side of the offset leg 140. The location of each first flexibility support 134 within the offset leg 140 with respect to the adjacent elbow fitting 124 is determined in the same manner as described above in connection with the flexibility supports 34 illustrated in FIG. 1.

In FIG. 4, another double-containment assembly embodying the present invention is indicated generally by the reference numeral 210. The components employed within the double-containment assembly 210 are the same as the components employed in the double-containment assembly 110 described above and illustrated in FIG. 3, and therefore like reference numerals preceded by the numeral 2 instead of the numeral 1 are used to indicate like elements. The double-containment assembly 210 differs from the double-containment assembly 110 in that instead of an offset construction, the double-containment assembly 210 forms an expansion loop 142 between two sections of straight pipe. The expansion loop 142 is formed by four elbow fittings 224 and three expansion legs 144 coupled between the four elbow fittings. As can be seen, each expansion leg 144 is relatively short in length in comparison to the other straight sections of pipe, and none of the expansion legs are long enough (based on equation (2) above) to accommodate an axial-guiding support like the axial-guiding supports 36 described above and illustrated in FIG. 1. The length $L_A$ of each of the two parallel legs 144 of the expansion loop 142 is determined based on the following equation:

$$L_A = [(0.75 \times \Delta L \times E \times D)/S]^{1/2}$$

wherein:

$L_A$ is the length of each of the two parallel legs of the expansion loop.

ΔL is the overall change in the linear dimension of the adjacent leg leading into the expansion loop due to expected thermal expansion or contraction calculated in accordance with equation (1) above, i.e., the overall change in linear dimension of the respective straight section of piping on the other side of the respective elbow fitting. For underground systems, the overall change in linear dimension is the overall change in linear dimension of the inner straight section of piping. For aboveground systems, wherein the outer piping is not constrained with respect to the inner piping, the overall change in linear dimension is the difference between the change in linear dimension of the outer straight section of piping and the change in linear dimension of the inner straight section of piping.

E is the modulus of elasticity of the piping material at the coolest expected temperature of operation of the piping for which the expected ΔL is determined.

D is the outside diameter of the piping for which the expected ΔL is determined.

S is the maximum desired working stress at operating temperatures of the piping for which the expected ΔL is determined.

The length $L_B$ of the expansion leg 144 extending between the two parallel expansion legs 144, as shown in FIG. 4, is preferably equal to approximately one-half of $L_A$ (0.5×$L_A$).

The location of each flexibility support 234 within the expansion loop 142 is preferably determined in the same manner as with the flexibility supports 34 described above in connection with FIG. 1. The distance L1 between the flexibility supports 234 is determined by employing equation (3) above, and the location of each first flexibility support with respect to the adjacent elbow fitting 224, e.g., L2 and L3 in FIG. 4, is determined so that the sum of L2 and L3 (L2+L3) is less than or equal to three-fourths of L1 in FIG. 4 [(L2+L3)≦(0.75×L1).

With most double-containment assemblies including an expansion loop as illustrated in FIG. 4, it is desirable to have little, if any lateral or radial movement of the inner straight pipe sections 212 and 214 relative to the outer straight pipe sections 218 and 220 in the areas adjacent to the elbow fittings 224. Instead, it is desirable to have substantially all bending absorbed by the elbows 224 and legs 144 of the expansion loop. Accordingly, it is not necessary to employ the flexibility supports 234 on either side of the expansion loop 142 (as opposed to within the expansion loop), since there is no need to accommodate lateral or radial movement of the inner piping in this area. Thus, in many such instances, the flexibility supports 234 are optional in these areas, although a flexibility support may be used instead of an axial-guiding support, if desired.

The distance X of the first axial-guiding support 236 with respect to each elbow fitting 224 (or the location of the first flexibility support 234 used instead of an axial-guiding support), which is the linear distance measured from the centerline of the adjacent expansion leg 144, is selected so that it is no greater than approximately 4 times the diameter of the inner piping. The second axial-guiding support 236 with respect to each elbow fitting is spaced a distance Y from the first axial-guiding support, which is no greater than approximately 14 times the diameter of the inner piping. The remaining axial-guiding supports 236 located between the second axial-guiding support 236 and the respective intermediate anchor 230 or 232 are substantially equally spaced relative to each other by a distance calculated in accordance with equations (3a)–(3d) above.

The expansion loop of the double-containment assembly 210 is advantageous for accommodating differential thermal expansion or contraction between the inner and outer piping components of an otherwise straight double-containment assembly. As described above, each of the four elbow fittings 224 is adapted to absorb differential thermal expansion or contraction of the inner piping components relative to the outer piping components by movement of the inner elbow section relative to the outer elbow section within the expanded outer annulus space 226. The expansion loop is therefore adapted to accommodate the differential thermal expansion or contraction of the piping components located between the intermediate anchors 230 and 232. By employing these types of expansion loops, offsets, and/or elbow fittings in accordance with the present invention, the outer diameter of the piping components can be minimized, resulting in space and material cost savings, while still accommodating differential thermal expansion or contraction of the inner and outer piping components relative to each other.

Figure 5:
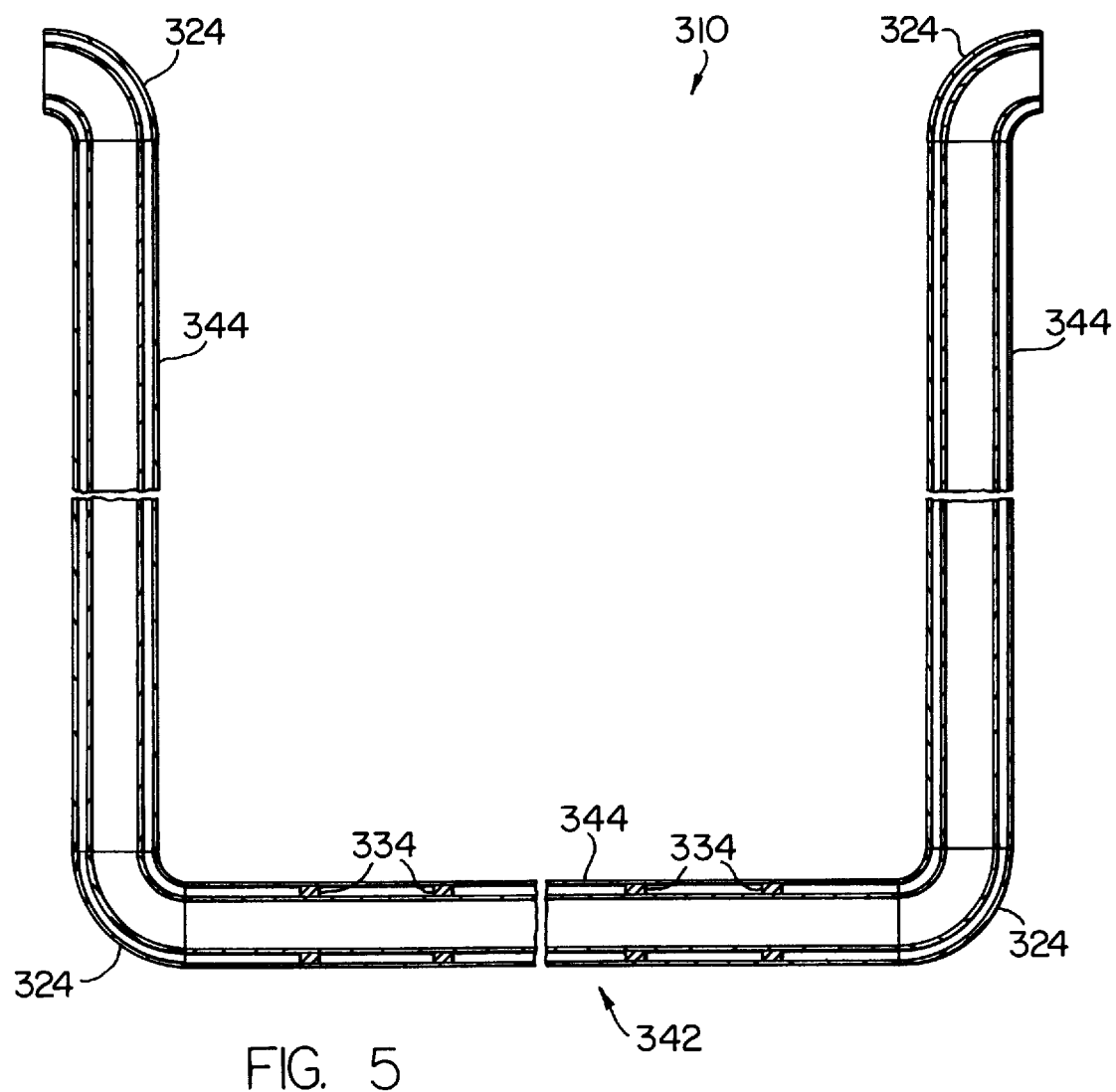
FIG. 5 is a partial schematic, cross-sectional view of another embodiment of a double-containment assembly of the present invention including an expansion loop oriented substantially in a vertical plane.

Turning to FIG. 5, another double-containment assembly embodying the present invention is indicated generally by the reference numeral 310. The double-containment assembly 310 employs many of the same components as the double-containment assembly 210 described above in connection with FIG. 4, and therefore like reference numerals preceded by the numeral 3 instead of the numeral 2 are used to indicate like elements. Like the double-containment assembly 210 described above, the double-containment assembly 310 includes an expansion loop formed by four elbow fittings 324 and three expansion legs 344 coupled between the four elbow fittings. This embodiment of the present invention differs from the embodiments described above, in that the expansion loop is located in a substantially vertical plane, whereas the expansion loop described above is located in a generally horizontal (or inclined, if necessary) plane. Thus, the center expansion leg 344 is oriented substantially horizontal, whereas the two parallel, side expansion legs are oriented substantially vertical. As can be seen, the vertical expansion legs 344 do not include any flexibility supports 334 (or any other type of interstitial supports), whereas the horizontal expansion leg 344 includes flexibility supports 334 substantially equally spaced relative to each other in the same manner as the flexibility supports 234 employed in the expansion loop of the double-containment assembly 210 described above. When determining the factors based on the weight of the inner piping of the horizontal expansion leg, however, it is appropriate to include the weight of the inner piping of each of the vertical expansion legs, which are also supported by the flexibility supports 334 in the horizontal expansion leg.

Turning to FIG. 6, another double-containment assembly embodying the present invention is indicated generally by the reference numeral 410. The double-containment assembly 410 includes many of the same components as the double-containment assemblies described above, such as the double-containment assembly 10 illustrated in FIG. 1, and therefore like reference numerals preceded by the numeral 1 are used to indicate like elements.

In this embodiment of the present invention there are no directional changes, such as offsets or expansion loops, but rather only straight pipe sections coupled between intermediate anchors, which in this embodiment of the present invention are termination fittings 430. A first flexibility support 434 is located approximately at the mid-point between the two termination fittings 430, and the other flexibility supports 434 are substantially equally spaced a distance L relative to each other between the first flexibility support 434 and each of the termination fittings 430. The spacing L is determined based on equations (3a)–(3d) above in the same manner as described for determining the spacing between the flexibility supports 34 in FIG. 1. In this embodiment of the present invention the flexibility supports 434 are advantageously employed between fixed anchor points to permit the primary piping to deflect between the fixed anchor points into a substantially sinusoidal shape, for example, as illustrated in FIG. 6, to accommodate differential thermal expansion of the inner piping components relative to the outer piping components.

In the embodiment of the present invention illustrated in FIG. 6 it may be possible to also employ axial-guiding supports, like the axial-guiding supports 36 described above in connection with FIG. 1, located between the flexibility supports 434 and the termination fittings 430, if there is sufficient distance between the termination fittings to accommodate such supports. Equation (1) above is employed to determine the distance from the first flexibility support 434 (preferably located approximately at the mid-point between the termination fittings 430) and the first axial-guiding support spaced away from the first flexibility support. If the distance between the first flexibility support and a respective termination fitting is greater than the calculated distance for the first axial-guiding support, then the axial-guiding supports may be mounted between the flexibility supports and the termination fittings in the same manner as described above for the axial-guiding supports 36 illustrated in FIG. 1.

In FIGS. 7–29, various embodiments of the centering or flexibility supports of the present invention are illustrated in further detail.

Figure 7:
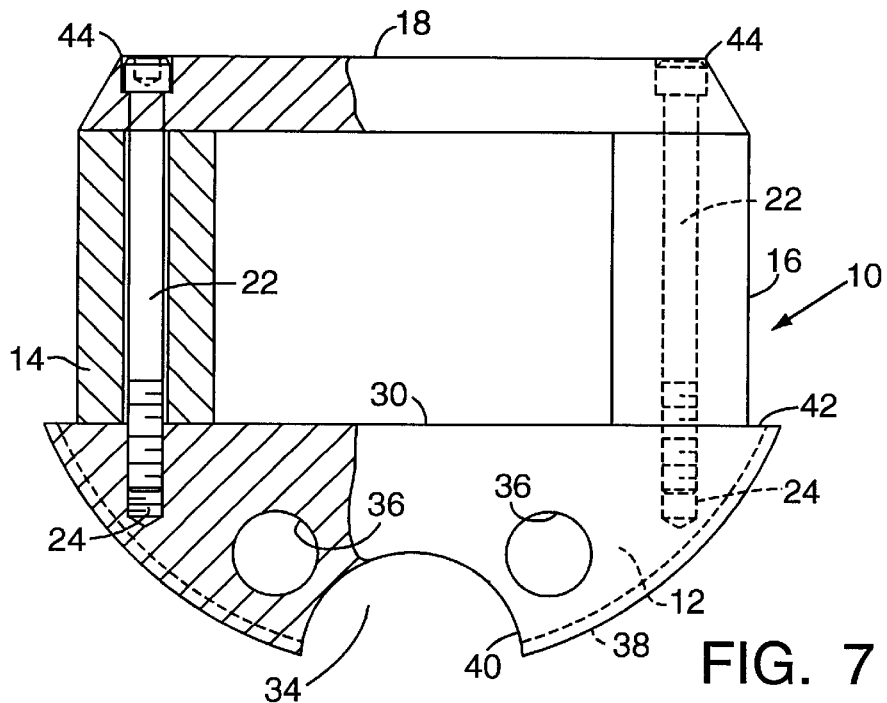
FIG. 7 is a front view in elevation, partly in section, of a first embodiment of the centering support assembly of the present invention.
Figure 8:
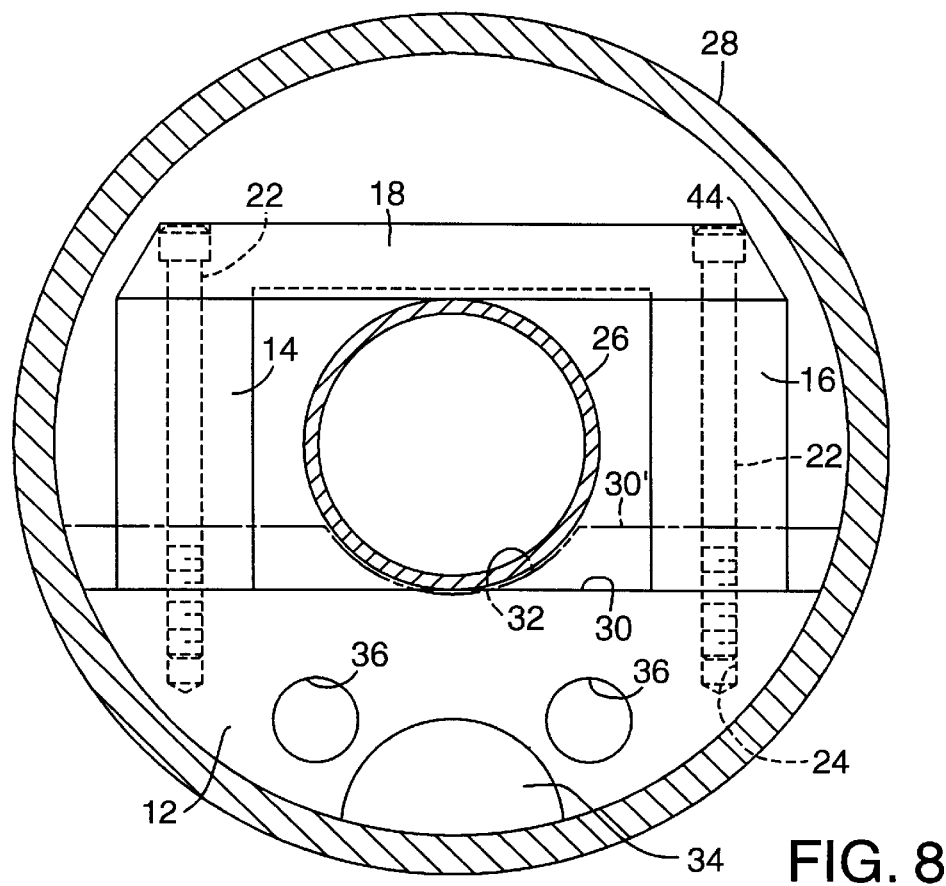
FIG. 8 is a view illustrating the centering support assembly of FIG. 7 mounted in a double-containment pipe assembly.

The centering support assembly 10 illustrated in FIGS. 7 and 8 includes a half-moon shaped support base 12 with two upright stanchions 14,16 at opposite sides of the base providing proper spacing between the base support 12 and a cross-head clamping piece 18. The entire assembly 10 is bolted together by bolts 22 received through the cross-head piece 18 and each stanchion 14,16, which is threadedly received in threaded bores 24 in half-moon base 12.

One or more inner or primary pipes 26 may be supported between the stanchions 14,16, which permit proper deflection of the pipes relative to each other and lateral deflection, if necessary, and similarly relative to an outer containment pipe 28. The cross-piece 18 and half-moon base 12 of the centering support assembly fit within the inner diameter of the outer containment pipe 28 with the cross-head piece 18 spaced from the inner diameter of pipe 28 to permit deflection of the outer pipe relative to the primary pipe 26 or pipes under load. The diameter of the half-moon base 12 should conform to the diameter of the outer containment pipe 28 and can be welded to the outer pipe.

The material of construction of the support assembly 10, including the base 12, stanchions 14 and 16 and crosspiece 18, can be formed from any metallic, reinforced or unreinforced thermosetting plastic or thermoplastic material. The base 12 can be constructed as a series of independent supports, or it can be manufactured as a continuous profile. Similarly, the crosspiece 18 can be constructed as a series of independent supports, or it can be manufactured as a continuous profile. The cross-head clamp 18 is provided to prevent buoyant forces from lifting (buckling) the primary piping during testing and flushing operations, or any operation where there is fluid in the annular space. If desired, a slight gap is provided between the bottom of the cross-head clamp 18 and the 12 o'clock position of the outside diameter of the primary piping system 26, as indicated by the dashed line in FIG. 2. This is important in systems where the primary piping is required to move freely in the longitudinal direction. For example, in order to accommodate for thermal expansion and contraction of the primary pipe relative to the outer pipe. Alternatively, the top can be designed without any clearance where a tight fit is more desirable. Structurally, the gap can be provided by adjusting the tension between the crosspiece clamp 18 and stanchions 14,16 by unthreading the bolts 22 from threaded bores 24 a slight amount. Tightening the bolts 22, conversely, provides a firmer clamping force or a smaller gap between the crosspiece 18 and the primary pipe.

An alternative design for the top surface 30 of the base 12 is to have the top portion 30' (phantom lines in FIG. 8) of the base 12 contact the primary piping in a seat 32 along a portion of the circumference of the primary piping 26, for up to half of the diameter of the primary piping 26. This allows the bearing load of the primary piping 26 on the support base 12 to be distributed in a more even fashion and lessens the total magnitude of the load at any one point.

Figure 8A:
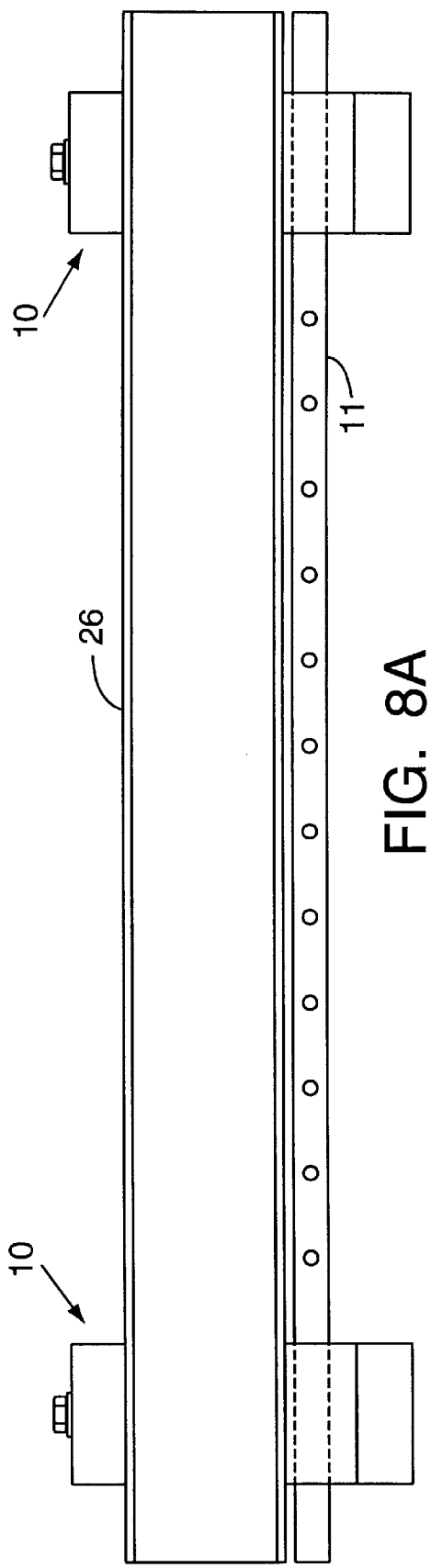
FIG. 8A is a cross-sectional view of a double-containment piping system employing several of the centering support assemblies of FIGS. 7 and 8 with perforated pipes extending between the centering support assemblies for flushing purposes and/or drying or purging purposes.

A cutout 34 in the base 12 can also be formed to allow fluid in the outer containment pipe to flow through the 6 o'clock position of the annular space. Also, this would allow a space for a leak detection cable to be placed. Optional holes 36 through the cross-section of the support base 12 can be provided that would potentially allow the supports to be connected by some means of pipes or bars. Potentially, a series of supports could be connected with small diameter perforated pipes 11 extending through the apertures 36, for example, that could serve as a means of spraying water for flushing purposes in the event of a primary piping leak, and also for distributing clean dry air or nitrogen for drying/purging purposes, as illustrated in FIG. 8A. This is an important feature because there is often poor flow capability in an annulus. Having flushing water distributed in a spray and/or vent gas distributed through the perforated pipes 11 would result in a much more efficient means of distribution.

Due to the space between stanchions 14,16, the primary piping 26 may also be positioned within the secondary containment piping 28 in an eccentric fashion. This is important where the diameter of the secondary containment piping must be increased, as in a specially designed expansion section, thereby allowing increased space or movement in a certain direction.

The edge 40 of the opening 34 at the 6 o'clock position of the annulus is preferably beveled completely across the thickness of the support and on both sides of the opening to preclude point loading of the support. The edge 42 of the top of the base 12 is also preferably beveled completely across the cross-section of the base, and on both sides. When a continuously extruded profile is used, as opposed to a series of independent supports, this edge may be permanently secured to the secondary containment piping by welding. The outside diameter 38 of the support base 12 is also preferably beveled completely around its circumference, and on both sides. Finally, the edges 44 of the crosspiece clamp 18 are beveled completely across its cross section, and on both sides, due to the fact that it represents a potential point of contact with the inside diameter of the secondary containment piping 28 when the secondary containment piping is in its deflected position in an underground application, to avoid point loading and breakage.

Figure 10:
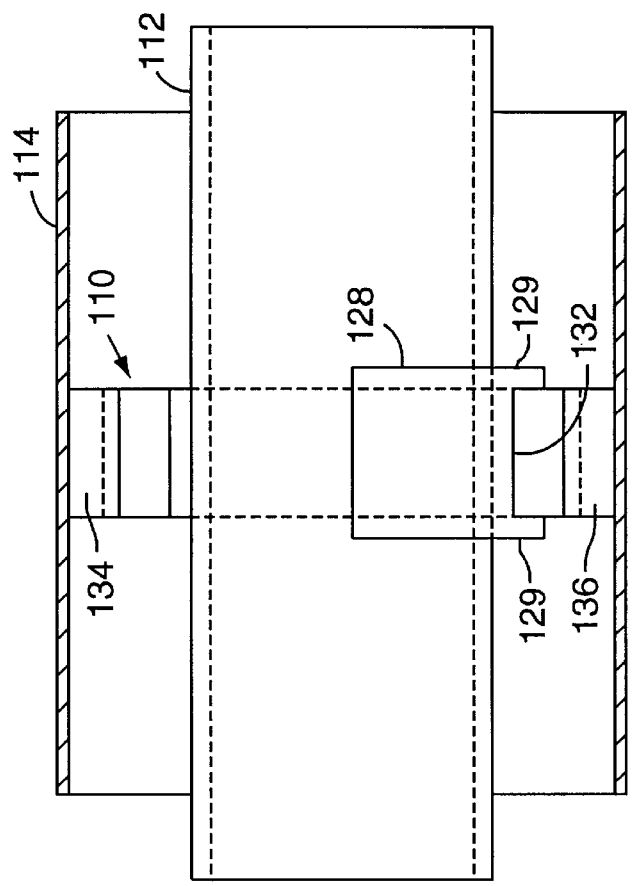
FIG. 10 is a partial cross-sectional view of the centering support assembly of FIG. 9.
Figure 9:
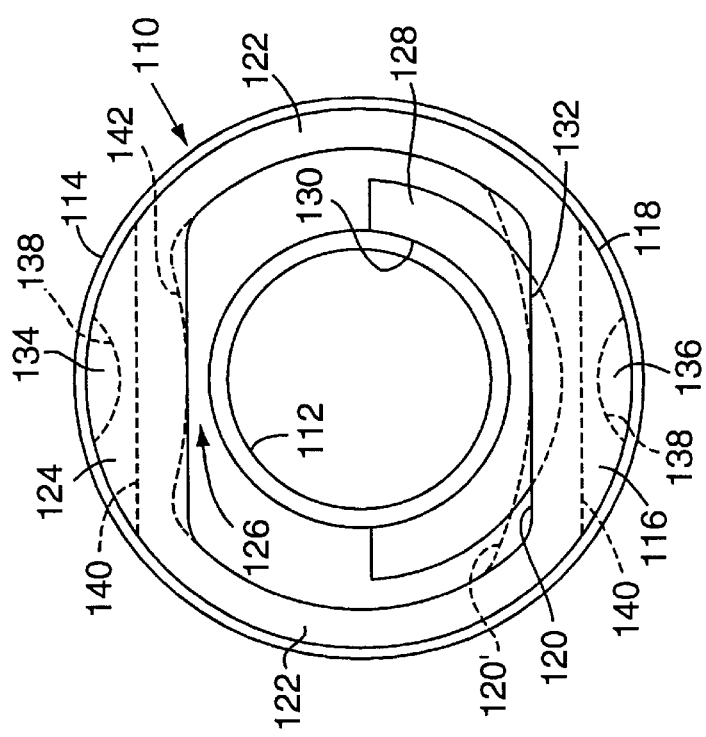
FIG. 9 is an end plan view of another embodiment of a centering support assembly of the present invention including a saddle seated between the primary pipe and the base of the centering support.

Turning to FIGS. 9 and 10, another centering support assembly embodying the present invention is indicated generally by the reference numeral 110. The centering support assembly 110 is seated between a primary pipe 112 and an outer or containment pipe 114 for supporting the primary pipe within the outer containment pipe, and for permitting both axial (or longitudinal) and lateral movement (which includes radial movement) of the primary pipe relative to the outer pipe to accommodate for thermal expansion and contraction and other forces and loads acting upon the double-containment piping system.

The centering support 110 includes a base portion 116 defining an arcuate surface 118, which defines a curvature substantially conforming to the curvature of the outer pipe 114 for seating against the inner surface of the outer pipe. The base portion 116 defines a support surface 120 on an opposite side of the base portion relative to the arcuate surface 118 for supporting the inner pipe 112 within the outer pipe 114. A pair of stanchion portions 122 are each coupled on one end to the base portion 116 and spaced apart on either side of the inner pipe 112 to permit lateral movement of the inner pipe over the support surface 120 relative to the outer pipe (this lateral movement can include radial movement, i.e., the inner pipe will frequently tend to move laterally and radially, which is described herein as lateral movement.)

As shown in FIG. 9, the outside surface of each stanchion portion 122 is a continuation of the arcuate surface 118, and substantially conforms to the curvature of the inner surface of the outer pipe 114. A crosspiece portion 124 extends between the other ends of the stanchion portions 122 and is located above the inner pipe 112 to define a space 126 between the crosspiece portion and the inner pipe to permit longitudinal or axial movement of the inner pipe, and substantially prevent vertical movement of the inner pipe. The space 126 is preferably defined by a minimal dimension, e. g., approximately 1/64 to 1/32 of an inch, to permit axial movement of the primary pipe, but prevent any substantial vertical movement of the primary pipe and minimize or dampen vibrational movement of the primary pipe.

A saddle 128 is seated between the inner pipe 112 and the support surface 120, and includes an arcuate surface 130 which defines a curvature substantially conforming to the curvature of the outside surface of the inner pipe 112, and defines on a side opposite the arcuate surface 130 a substantially flat, rectangular surface 132 seated in engagement with the flat surface 120, as indicated by dashed lines in FIG. 3. The flat surface 132 is formed by removing a chord of material from the base of the saddle 128, defining lips 129 located on either side of the rectangular surface 132 and extending downward over both sides of the base 116. The lips 129 are dimensioned long enough (in the downward direction over the edge of the surface 120 and covering a portion of the base 116) so that as the primary pipe 112 moves in the axial and/or radial directions, the saddle 128 does not become dislodged from the base 116.

In one embodiment of the present invention, the saddle 128 is welded, bonded or otherwise attached to the primary pipe 112 along the edges of the arcuate surface 130. In this situation, the other components of the center support 110 are not attached to the outer pipe 114, in order to permit longitudinal (or axial) movement of the primary pipe (and center support) relative to the outer pipe 114, in response to thermal expansion or contraction, for example. The inner pipe 112 is also permitted to move laterally relative to the outer pipe 114 by virtue of the saddle 128 sliding relative to the surface 120. Alternatively, rather than attaching the primary pipe 112 to the saddle 128, these components may remain unattached (and thus slidable relative to each other), and the base 116 may be welded, bonded or otherwise attached to the outer pipe 114. In this situation, both longitudinal and lateral movement of the inner pipe 112 relative to the outer pipe 114 is still permitted.

As shown in FIG. 9, the saddle 128 covers approximately 180° of the outside surface of the primary pipe 112. One advantage of this configuration, is that the saddle uniformly supports the primary pipe over approximately 180° of the outer circumference of the pipe, which may be strongly recommended or required for some pipes, including, but not limited to, fiberglass pipes. Preferably, the amount of the outside surface of the primary pipe 112 that the saddle 128 is designed to contact, is within the range of approximately 90° to 360°, and preferably approximately 120° to 360° depending upon the requirements of the particular pipe.

The centering support 110 also defines a top space 134 between the crosspiece portion 124 and the outer pipe 114, and a bottom space 136 between the base 116 and the outer pipe 114. The top space 134 and the bottom space 136 may be defined in any of numerous shapes or configurations, such as by forming semicircular cutouts 138 or by cutting flat cords 140, as illustrated in dashed lines in FIG. 9. The locations of the cutouts defining the spaces 134 and 136 are not limited to the 6 o'clock and 12 o'clock positions, as illustrated in FIG. 9, but rather can be located at any other point along the periphery of the centering support, and/or additional cutouts can be defined at other such locations, if necessary.

It may also be desirable to form the surface 120 of the base 116 to have a curvature as indicated by reference numeral 120', illustrated in dashed lines in FIG. 9. In this situation, the surface 132 of the saddle 128 is also formed with a curvature that substantially conforms to the curvature of the surface 120'. In this embodiment, when there is lateral movement of the primary pipe 112, the primary pipe simultaneously moves upward along a path defined by the curved surface 120'. Preferably, the inside surface of the crosspiece portion 124 is formed with a complementary curvature, i.e., a surface that curves upward from the center of the crosspiece portion toward each stanchion 122, as indicated by the dashed line 142 in FIG. 9. Because the space 126 is a relatively narrow space, the upward curvature defined by the surface 142 permits vertical and longitudinal movement of the pipe 112 as it moves laterally along the curved surface 120'.

Figure 12:
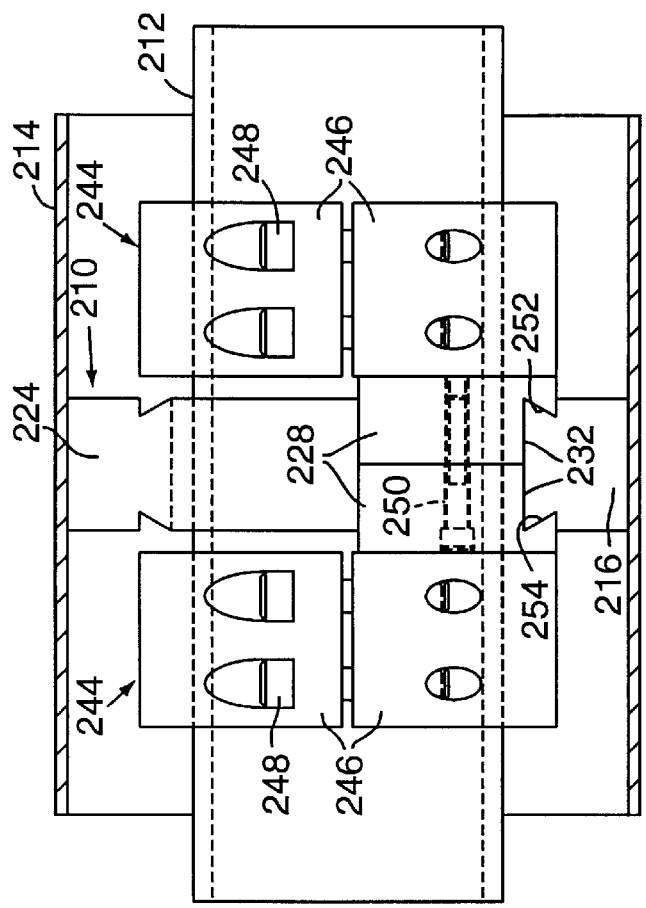
FIG. 12 is a partial cross-sectional view of the centering support assembly of FIG. 11.
Figure 11:
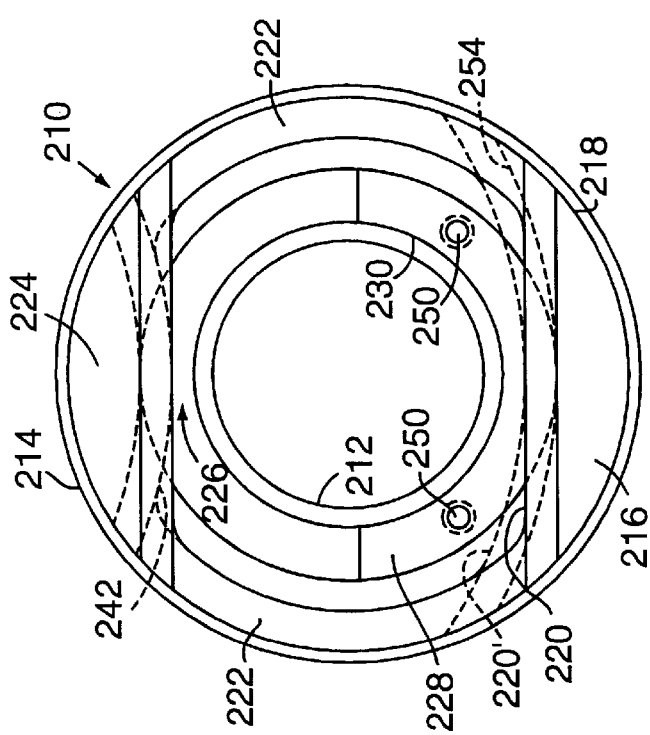
FIG. 11 is an end plan view of another embodiment of a centering support assembly of the present invention, wherein the centering support is mechanically coupled to the primary pipe by a pair of clamps.

Turning to FIGS. 11 and 12, another centering support assembly embodying the present invention is indicated generally by the reference numeral 210. The centering support 210 is similar to the centering support 110 described above in connection with FIGS. 9 and 10, and therefore like reference numerals preceded by the numeral 2 instead of the numeral 1 are used to indicate like elements. One of the differences of the centering support assembly 210, is that the centering support is fixed relative to the inner pipe 212 by means of a pair of clamps 244. As shown in FIG. 12, each clamp 244 has a pair of semi-circular halves 246 fitted over the primary pipe 212, and both halves are coupled together and clamped into engagement with the primary pipe by means of a pair of threaded fasteners 248.

Another difference of the centering support assembly 210 is that the saddle comprises two halves 228. The halves 228 of the saddle are located on opposite sides of the centering support 210 relative to each other, and are coupled together by a pair of threaded fasteners 250, which clamp the halves 228 of the saddle into engagement with the base 216 of the centering support. As shown in FIG. 12, each half 228 of the saddle defines a dovetail surface 252 located on one side of the rectangular surface 232, which is seated in engagement with a corresponding dovetail surface 254 formed along the adjacent top edge of the base 216.

One advantage of this configuration, is that when the two halves 228 of the saddle are joined together by the threaded fasteners 250, the saddle cannot become easily dislodged from the base 216 of the entering support, but rather is locked to the base. Another advantage of this configuration, is that because the two halves 228 of the saddle are coupled together by mechanical means, such as the threaded fasteners 250, the degree to which the saddle is attached to the base can be adjusted by adjusting the threaded fasteners. For example, the halves 228 of the saddle can be loosened with respect to the base 216 of the centering support, to permit the saddle to slide more easily over the surface 220 of the base.

Another advantage of this embodiment of the present invention, is that it does not require any of the components to be welded or bonded to one another. The two clamps 244 mechanically fix the centering support assembly 210 with respect to the primary pipe 212 without requiring the primary pipe or secondary containment pipe to be welded, bonded or otherwise attached to another of the components of the centering support assembly. The base 216 is not attached to the outer pipe 214, thus permitting both lateral and longitudinal movement of the primary pipe relative to the outer pipe. Mechanical attachment, as in this embodiment, is frequently less costly than welding or adhesive bonding, particularly in larger double-containment systems requiring many centering support assemblies.

It is also noted that although the dovetail surfaces 252 and 254 illustrated in FIG. 12 define a substantially rhombezoidal shape, other shapes can equally be used which will cause a mechanical interlock between the two halves 228 of the saddle and the base 216 of the centering support.

As illustrated in FIG. 11, the top surface 220 of the base 216 may equally be formed with a curvature, as indicated by the dashed line 220'. This configuration is particularly advantageous in reducing stress, by directing the primary pipe 212 to distort in substantially the same direction by which it may tend to expand (i.e., outward and upward), thus simultaneously providing vertical support or the primary pipe throughout the temperature cycle causing the expansion or contraction. As also described above, if the base surface 220 is formed with a slight curvature, as indicated by the dashed line 220', then the bottom surface 242 of the crosspiece portion 224 is also formed with a slight upward curvature, extending upward from the center of the crosspiece portion 224 and outward toward each respective stanchion portion 222, as indicated by the dashed line 242 in FIG. 11. The complementary upward curvature of the bottom surface 242 of the crosspiece portion 224 permits the inner pipe 212 to move upward along the surface 220' as it moves laterally relative to the outer pipe 214 when undergoing expansion. In this situation, the rectangular surface 232 and the dovetailed surface 252 of each half 228 of the saddle are also formed with a curvature that substantially matches or corresponds to the curvature of the surface 220'. The dovetailed surfaces 254 of the base 216 are also formed with a curvature substantially corresponding to the curvature of the surface 220', as also indicated by dashed lines in FIG. 11, to permit the saddle 228 to slide along the surface 220' with lateral movement of the primary pipe 212.

In FIGS. 13 and 14, another centering support assembly embodying the present invention is indicated generally by the reference numeral 310. The centering support 310 is substantially the same as the center support 110 described above with reference to FIGS. 9 and 10, and therefore like reference numerals preceded by the numeral 3 instead of the numeral 1 are used to indicate like elements.

A main difference of the center support 310 in comparison to the center support 110 described above, is that the center support 310 also functions as a coupling between two sections of outer pipe 314, as shown in FIG. 14. The center support 310 defines a raised annular portion 356 on its outside surface, as illustrated in FIG. 14. As can be seen, the outside diameter of the raised annular portion 356 is substantially the same as that of each section of outer pipe 314. on either side of the raised annular portion 356, is defined a corresponding recessed annular surface 358, the outside diameter of which is slightly less than the inside diameter of each outer pipe 314. A tapered or beveled surface 360 extends between the raised annular portion 356 and each recessed annular surface 358, as also shown in FIG. 14. As can be seen, the tapered surfaces 360 taper in substantially opposite directions relative to each other.

The outer pipes 314 are assembled to the center support 310 by slipping the end of each outer pipe over a respective annular recesses surface 358, as shown in FIG. 14. The end surface of each outer pipe 314 is then welded (or bonded) along the adjacent edge of the raised annular surface 356, thus coupling the two sections of outer pipe 314 together, and fixing the position of the center support 310 with respect to the outer pipe. In this embodiment of the present invention, the primary pipe 312 is preferably not welded or otherwise attached to any of the components of the center support assembly 310, in order to permit lateral, longitudinal, and/or radial movement of the inner pipe with respect to the outer pipe. The lip portions 329 extending downward on either side of the saddle 328 over the base 316 are dimensioned long enough in the vertical direction to prevent the saddle from becoming dislodged with respect to the base upon movement of the inner pipe relative to the outer pipe.

As shown in FIG. 3, the top space 334 may be defined by a circular cutout extending through the crosspiece portion 324, as indicated by the dashed line in FIG. 13. As will be recognized by those skilled in the art, the cutout may take the form of any numerous shapes, and does not necessarily have to be located at the 12 o'clock position, but may equally be located, and/or additional cutouts may be located at other positions throughout the crosspiece portion, the stanchions, and the base of the center support. As also shown in FIG. 13, the bottom space 336 may also be defined by any of numerous shapes, such as a circle, a rectangle, or a ellipsoid, as indicated in dashed lines in FIG. 13. Both the top space 334 and the bottom space 336 are dimensioned large enough so as to allow adequate venting of air and/or to permit the flow of fluid through the annulus between the inner pipe 312 and outer pipe 314, if necessary.

One advantage of this embodiment of the present invention, is that the center support 310 remains fixed with respect to the outer containment pipe 314, and thus in a complicated or large double-containment piping system, the ability to track and/or locate the centering supports within the system is facilitated. Another advantage of this embodiment of the present invention, is that it may be easier to mount the center support within the double-containment piping system, in comparison to other embodiments wherein the center support must be inserted at a midpoint, for example, between the ends of a double-containment straight pipe section, when the outer jacket is relatively close in diameter to the inner pipe, or when several center supports are spaced apart from each other within sections of inner and outer pipe.

Figure 16:
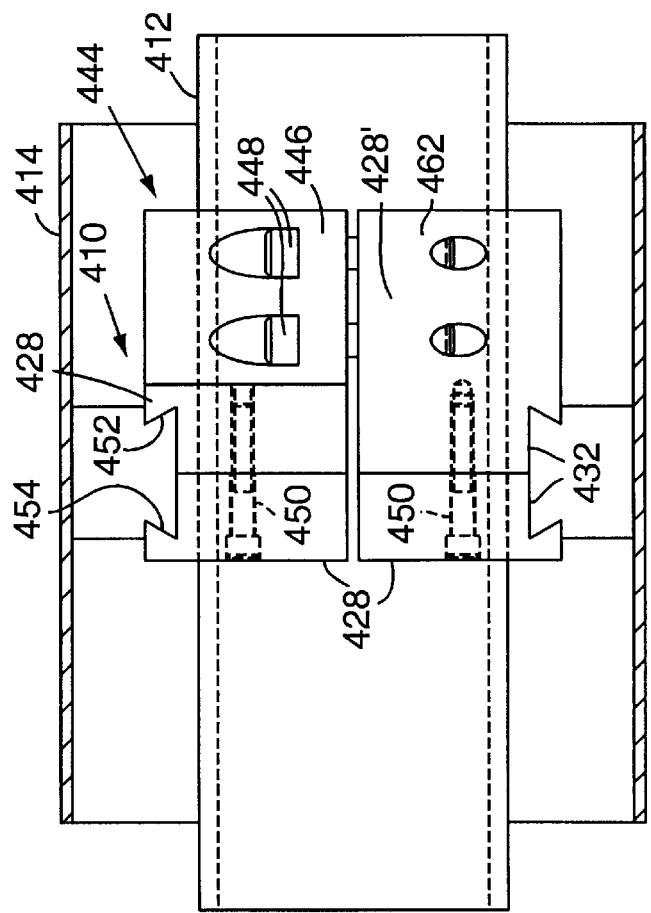
FIG. 16 is a partial cross-sectional view of the centering support assembly of FIG. 15.
Figure 15:
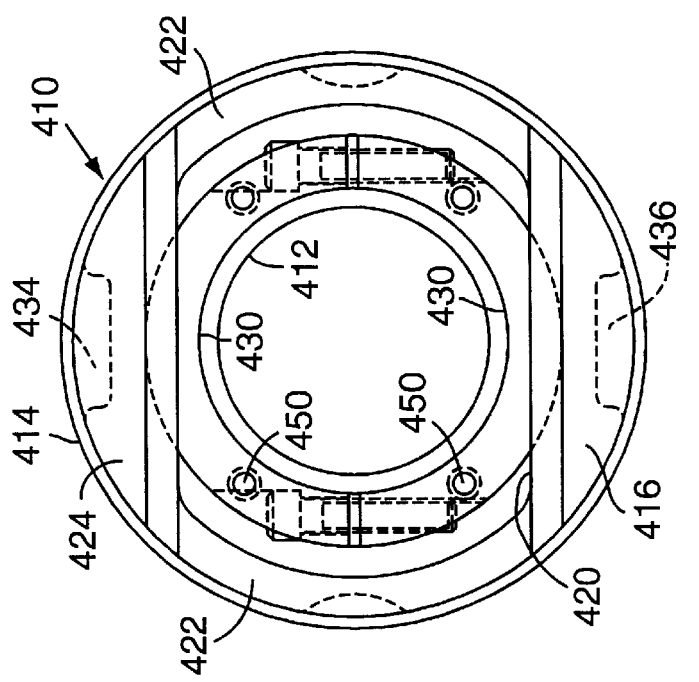
FIG. 15 is an end plan view of another embodiment of a centering support assembly of the present invention, in which the centering support is mechanically coupled to the primary pipe by a single clamp.

In FIGS. 15 and 16 another embodiment of a centering support assembly of the present invention is indicated generally by the reference numeral 410. The centering support 410 is similar to the centering support 210 described above with reference to FIGS. 11 and 12, and therefore like reference numerals preceded by the numeral 4 instead of the numeral 2 are used to indicate like elements.

One of the differences of this embodiment in comparison to the embodiment of FIGS. 11 and 12, is that the centering support assemble 410 includes two saddles 428, an upper saddle and a lower saddle. As shown in FIG. 16, the upper saddle 428 includes two halves, which are the same as the halves illustrated in FIG. 12. The bottom saddle 428, however, includes a first saddle half which is the same as the other saddle halves, and a second saddle half 428' which is formed as an integral part of the semicircular half 462 of the clamp 444. The threaded fasteners 450 extend through the saddle half 428 and into the saddle half 428', thus mechanically coupling the saddle halves and the clamp 444 together.

One advantage of this embodiment of the present invention, is that because at least one of the saddle halves is formed as an integral part of the clamp assembly 444, there is only the need for one clamp assembly to fix the position of the center support 410 with respect to the primary pipe 412. In this embodiment of the present invention, some of the components of the center support 410 are attached to the outer pipe 414, thus permitting both lateral and longitudinal movement of the primary pipe relative to the outer pipe.

One reason for employing the additional pair of saddle halves 428 located on top of the primary pipe 412, is to substantially prevent vertical movement of the primary pipe, for example, vertical movements due to buoyant forces acting on the primary pipe if the annulus between the primary pipe and the outer pipe fills with fluid. Another reason for employing the additional saddle is to control or limit any vibrational movements of the primary pipe, since both saddles 428 are either seated in engagement with the primary pipe 412, or are closely spaced with respect to the primary pipe.

In FIGS. 17 and 18 another center support assembly embodying the present invention is indicated generally by the reference numeral 510. The center support 510 is similar to the center support 310 described above in connection with FIGS. 13 and 14, and therefore like reference numerals preceded by the numeral 5 instead of the numeral 3 are used to indicate like elements. A main difference of the center support 510 in comparison to the center support 310 of FIGS. 13 and 14, is that the center support 510 includes a pair of integral flanges 566 located on opposite sides of the center support relative to each other for attaching the center support to sections of outer pipe 514. As shown on the left-hand side of FIG. 18, the outer pipe 514 can be butt-welded to the end surface of a respective annular flange 566, or as shown on the right-hand side of FIG. 18, the outer pipe 514 can be nested within an annular flange 566. In either case, the center support assembly 510 functions as both a coupling to connect the two section of outer pipe 514 together and as a centering support for the primary pipe.

As shown in FIG. 17, the top space 534 and the bottom space 536 are each defined by a circular cutout (other shapes are possible) extending through the center support. The center support may also define additional apertures extending either through the station portions 522, as indicated by the dashed lines 535 in FIG. 17, or may also be formed through the crosspiece portion 524 and/or base portion 516, if necessary.

The nested engagement of the outer pipe 514 within the annular flange 566 is employed in piping systems that require socket joining methods, for example, adhesive-bonded fiberglass piping, solvent-cemented thermoplastics, such as PVC, heat-fusion socket-joined thermoplastic systems, such as polyethylene, socket-welded steel systems, etc. Although the flange 566 on the right-hand side of FIG. 18 forms a female fitting, it can equally be designed as a male fitting, i.e., to be nested within the outer pipe, if necessary.

As shown in FIG. 18, the top surface defining the hole 534 is nearly flush with the inside surface of each annular flange 566, and the bottom inside surface defining the hole 536 is also nearly flush with the inside surface of the annular flanges 566, in order to avoid a "dead leg", in which fluid or gases can become trapped within the space adjacent a respective hole.

As shown in FIG. 17, the bottom surface defining the crosspiece portion 524 is spaced above the outside surface of the inner pipe, thus defining a space 526 between the inner pipe and the crosspiece to permit longitudinal (or axial), and lateral movement of the primary pipe 512 relative to the outer pipe to accommodate, for example, thermal expansion and contraction of the primary pipe. The top surface 520 of the base 516 may also be formed with a concave curvature, as indicated by the dashed line 520', and the bottom surface of the crosspiece 524 may likewise be formed with a complementary curvature, as indicated by the dashed line 542, in order to simultaneously move the primary pipe upward as it moves laterally over the base 516.

In FIGS. 19 and 20 another center support assembly embodying the present invention is indicated generally by the reference numeral 610. The center support 610 is similar to the center support 510 described above with reference to FIGS. 17 and 18, and therefore like reference numerals preceded by the numeral 6 instead of the numeral 5 are used to indicate like elements. The center support 610 differs from the center support 510 in that the annular flanges 666 each define tapered surfaces for engagement with corresponding tapered surfaces on the sections of outer pipe or other fittings 614, as illustrated in FIG. 20. The annular flange 666 on the left-hand side of FIG. 14 defines a male fitting, and thus the outside surface of the flange 666 is tapered to match the taper on the inside surface of a respective outer-pipe component 614 (for example, the belled-end of a pipe, a coupling, elbow, tee, valve, union, etc.). The annular flange 666 on the right-hand side of FIG. 20, on the other hand, defines a female fitting, and thus is tapered on its inside surface in order to receive a correspondingly tapered male component of an outer-pipe component 614.

This embodiment of the present invention is particularly advantageous for use in piping systems that require socket-joining methods, for example, adhesive-bonded fiberglass piping, solvent-cemented thermoplastics, such as PVC, heat-fusion socket-joined thermoplastic systems, such as polyethylene, and socket-welded steel systems. The tapered configuration facilitates the proper joining of the outer pipe 614 to the center support assembly 610, and more uniformly distributes the stresses developed within such a system in comparison to a similar fitting without any such tapers. Parts 666 and 614 do not always have to be tapered if the piping system uses a "straight" socket joining method, or an "interference-fit" method.

As shown in FIG. 20, each of the apertures 634 and 636 (along with the apertures 635, as shown in FIG. 19), is sloped at an angle substantially corresponding to the taper of the adjacent inside surface of the female flange 666. One advantage of this configuration is that it prevents the formation of a "dead space" or "dead leg" adjacent each aperture, in which air or fluid may become trapped within a pocket between the aperture and the inside surface of the annular flange.

Figure 22:
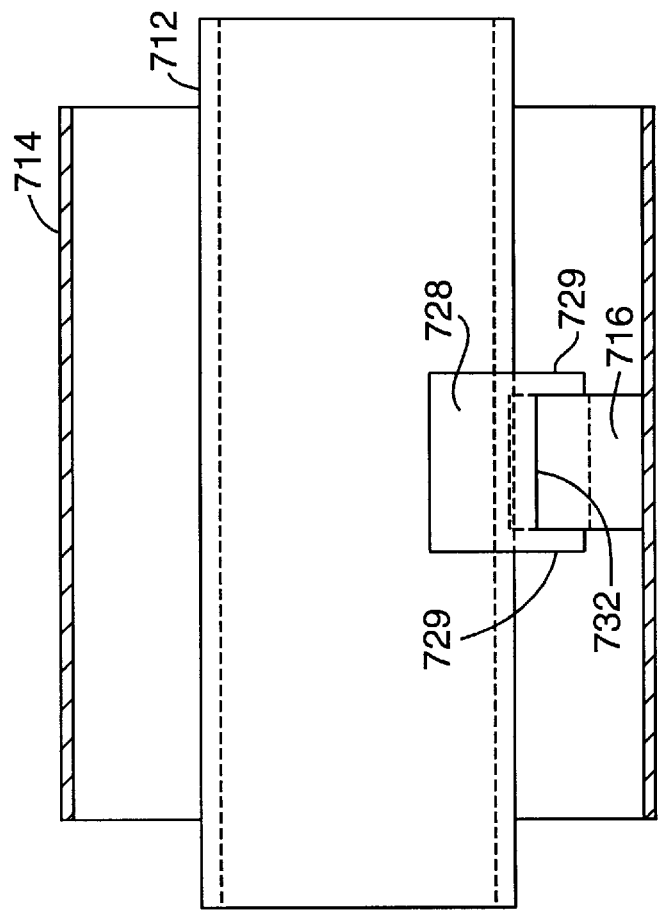
FIG. 22 is a partial cross-sectional view of the centering support assembly of FIG. 21.
Figure 21:
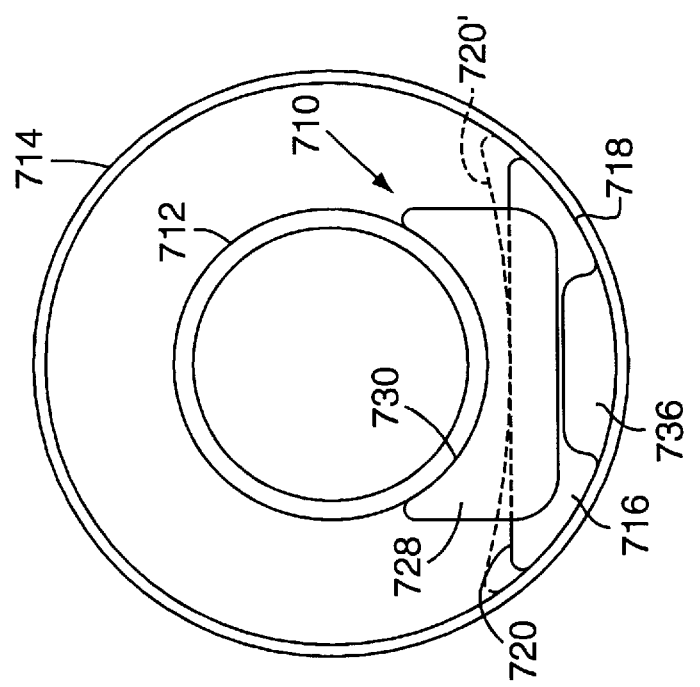
FIG. 21 is an end plan view of another embodiment of a centering support assembly of the present invention, including a slidable saddle for lateral and longitudinal movement of the primary pipe relative to the outer pipe.

In FIGS. 21 and 22, another center support assembly embodying the present invention is indicated generally by the reference numeral 710. The center support 710 is similar to the center support 110 described above with reference to FIGS. 9 and 10, and therefore like reference numerals preceded by the numeral 7 instead of the numeral 1 are used to indicate like elements. The center support assembly 710 differs from the center support 110 in that the center support 710 does not include stanchion portions or a crosspiece portion. Rather, a base portion 716 includes on one side an arcuate surface 718 defining a curvature substantially conforming to the curvature of the inside surface of the outer pipe 714, and a support surface 720 located on the opposite side of the base relative to the arcuate surface 718. The saddle 728 is seated on the support surface 720, and defines a curved surface 730 which is seated in engagement with the outside surface of the inner pipe 712 along a substantial portion of the surface of the inner pipe. Preferably, the curved surface 730 is seated in engagement with at least a 120° portion of the inner pipe in order to prevent the inner pipe from becoming dislodged from the saddle.

As in the embodiments described above, the surface 720 of the saddle may be formed with a slight curvature, as indicated by the dashed line 720' in FIG. 21, and the surface 732 on the bottom side of the saddle 728 is formed with a corresponding curvature, in order to simultaneously move the inner pipe 712 vertically with corresponding lateral movement of the inner pipe.

In this embodiment of the present invention, the inner pipe 712 is preferably welded or otherwise bonded to the saddle 728, whereas the base 716 is not attached to the outer pipe 714. In this situation, the inner pipe 712 is permitted to move longitudinally (or axially) relative to the outer pipe 714, by movement of the base 716 relative to the outer pipe 714. However, if desired, the base 716 can be welded or otherwise attached to the outer pipe 714, and the primary pipe is instead permitted to move longitudinally (or axially)

relative to the saddle 728 in order to accommodate for thermal expansion or contraction. In either situation, the primary pipe is permitted to move laterally by sliding the saddle 728 over the support surface 720.

Figure 24:
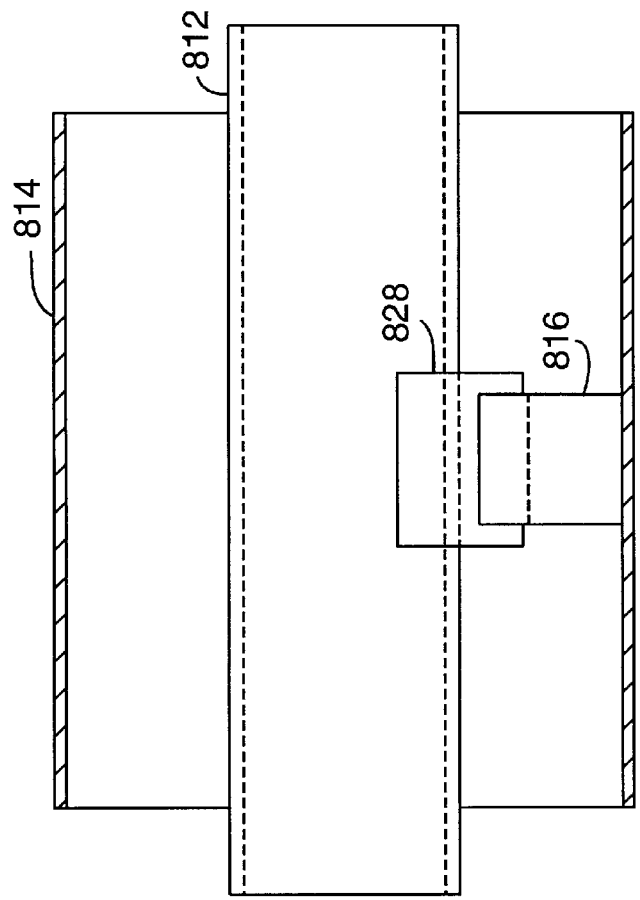
FIG. 24 is a partial cross-sectional view of the centering support assembly of FIG. 23.
Figure 23:
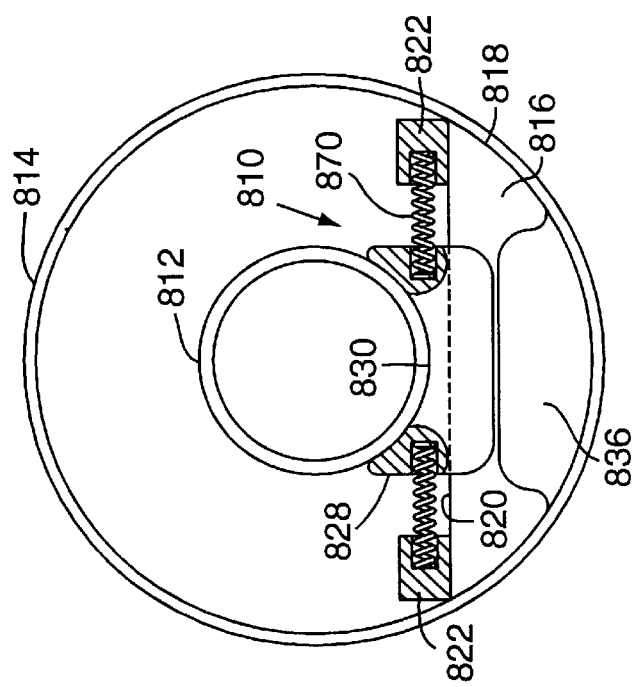
FIG. 23 is an end plan view of another embodiment of a centering support assembly of the present invention, including spring members coupled between the saddle and the stanchions to control the lateral movement of the saddle and/or dampen vibrational movements.

Turning to FIGS. 23 and 24, another center support assembly embodying the present invention is indicated generally by the reference numeral 810. The center support 810 is similar to the center support 710 described above with reference to FIGS. 21 and 22, and therefore like reference numerals preceded by the numeral 8 instead of the numeral 7 are used to indicate like elements.

The center support 810 differs from the center support 710 in that it includes a pair of stanchion portions 822, each coupled to the base 816 and located on opposite sides of the inner pipe 812 relative to each other. As with the center support 710, the center support 810 also does not include a crosspiece portion. A spring member 870 is coupled between each stanchion portion 822 and a respective side of the saddle 828. As shown in FIG. 23, one end of each spring member 870 is received within a recess formed in a respective stanchion 822, and the other end of each spring member is received within a recess formed within a respective side wall of the saddle 828. The stanchion portion 822 can be formed as an integral part of the base, and can extend all the way to the inside surface of the outer pipe 814, if desired.

One advantage of this embodiment of the present invention, is that the springs 870 control the radial movements of the primary piping 812, and also facilitate in reducing vibrations within the double-containment system when this is a concern.

As also shown in FIG. 23, the bottom space 836 is defined by a generally rectangular cutout, the top surface of which is substantially parallel to the support surface 820 on the other side of the base 816. This configuration provides a relatively wide opening beneath the base 816, and thus permits relatively substantial fluid flow when this is a concern.

As will be recognized by those skilled in the art, it is not necessary to employ coil springs as the spring members 870 as illustrated in FIG. 23, but rather other biasing members may equally be employed, such as a resilient plastic member coupled in tension between the stanchion 828 and each respective stanchion 822.

In FIGS. 25 and 26, another center support assembly embodying the present invention is indicated generally by the reference numeral 910. The center support 910 is similar to the center support 810 described above with reference to FIGS. 23 and 24, and therefore like reference numerals preceded by the numeral 9 instead of the numeral 8 are used to indicate like elements.

As shown in the drawings, the saddle 928 is not seated in engagement with the surface 920 of the base 916, but rather is coupled to the base by four hinge members 972. Each hinge member 972 is coupled on one end by a fastener 974 to the saddle 928, and is coupled on the other end by another fastener 974 to the base 916. There are two hinge members 972 located on each side of the saddle 928, which are spaced apart from each other near opposite ends of the saddle relative to each other. The fasteners 974 permit the respective hinge member 972 to pivot with respect to both the saddle 928 and the base 916. For example, the fasteners 974 may be formed by rivets which permit such pivotal movement of the hinge members relative to the saddle and/or base. Thus, the center support assembly 910 permits lateral movement of the primary pipe 912 relative to the outer pipe 914 by movement of the saddle 928 relative to the base 916 to accommodate, for example, thermal expansion and contraction of the primary pipe 912 relative to the outer pipe 914.

If necessary, the top surface 920 of the base 916 can be formed with a substantially convex curvature, as indicated by the dashed line 920' in FIG. 25, and the bottom surface 932 of the saddle 928 can be formed with a complementary substantially concave curvature, as indicated by the dashed line in FIG. 25. This configuration is particularly advantageous if there are space constraints, since less space is required between the base 916 and the saddle 928—in order to accommodate lateral movement of the saddle relative to the base.

In FIGS. 27 and 28, another version of a centering support assembly embodying the present invention is indicated generally by the reference numeral 1010. The center support 1010 is similar to the center support 910 described above with reference to FIGS. 25 and 26, and therefore like reference numerals preceded by the numeral 10 instead of the numeral 9 are used to indicate like elements. In the center support 1010, the base 1016 defines a pair of parallel channels 1076 formed within the support surface 1020, as shown in FIG. 28. The saddle 1028 includes four roller bearings 1078, wherein one pair of roller bearings is located on one side of the saddle 1028 and the other pair is located on an opposite side of the saddle. Both pairs of roller bearings 1078 are spaced apart from each other on either end of the saddle, as shown in FIG. 27. Each roller bearing 1078 is seated within a respective channel 1076 within the base 1016, and thus permits the saddle 1028 to move laterally across the base 1016 by the rolling action of the bearings within the channels to permit lateral movement of the inner pipe 1012 relative to the outer pipe 1014.

Figure 29:
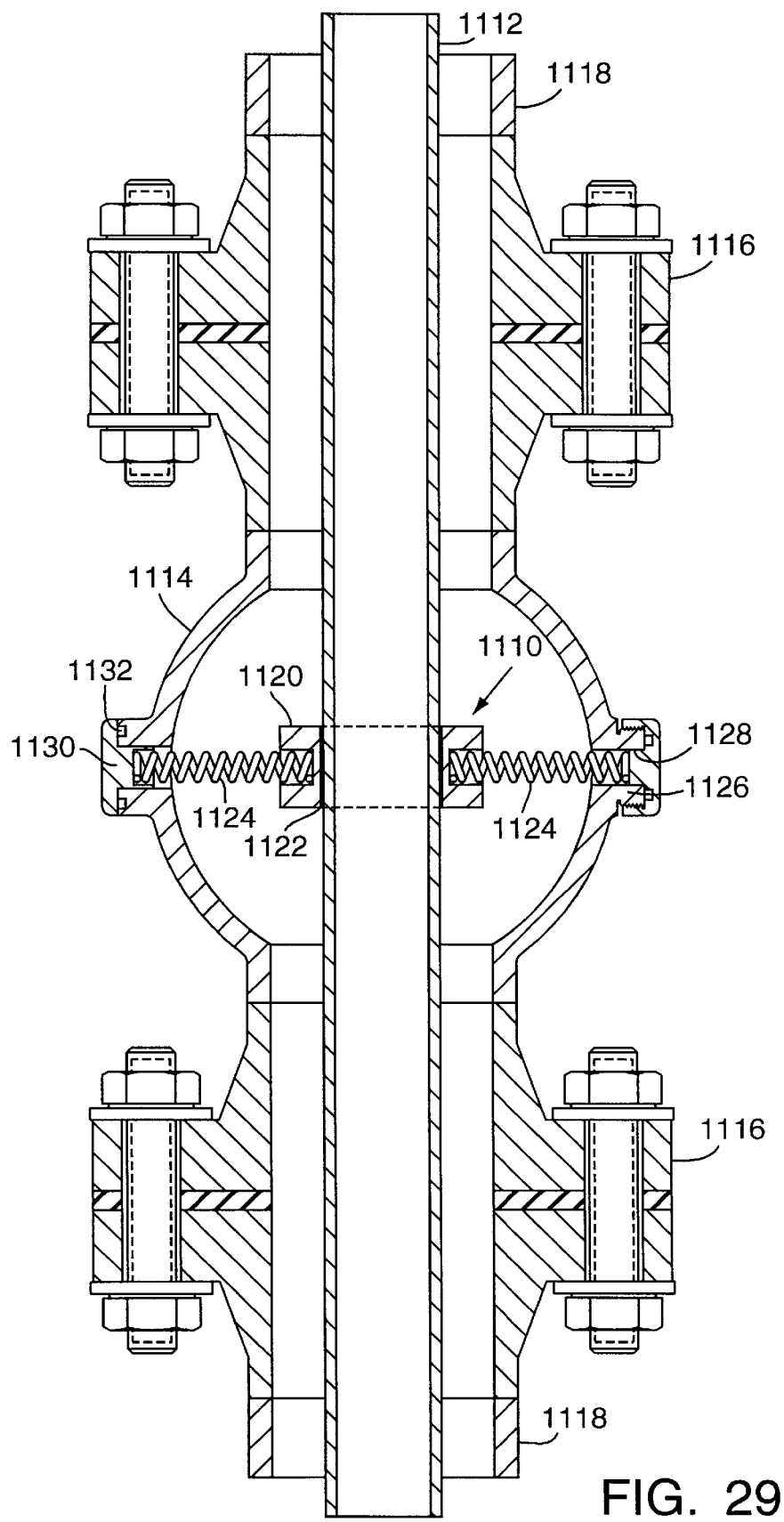
FIG. 29 is a partial cross-sectional view of another embodiment of a centering support assembly of the present invention, in which the primary piping is vertically oriented, and spring members are coupled between the base and an outer containment housing to control lateral movement of the primary piping relative to the outer containment components and to dampen vibrational movements.

In FIG. 29, another embodiment of a center support assembly of the present invention is indicated generally by the reference numeral 1110. As can be seen, the primary or inner pipe 1112 is oriented generally vertically, and extends through a containment housing 1114. Flanged couplings or connections 1116 are coupled to either end of the containment housing 1114, and the other end of each flanged connection 1116 is coupled to a section of outer or containment pipe 1118.

The center support 1110 includes a base or ring 1120, which defines a central aperture 1122 extending through the central portion of the base or ring, as illustrated in dashed lines in FIG. 23. As shown in FIG. 29, the diameter of the central aperture 1122 is greater than the outer diameter of the inner pipe 1112, for receiving the inner pipe through the aperture and permitting axial (or longitudinal) movement of the inner pipe. A plurality of spring members 1124 are each coupled on one end to the base or ring 1120, and coupled on the other end to a respective flange portion 1126 of the containment housing 1114. As shown in FIG. 29, one end of each spring member 1124 is received within an aperture formed within the outside surface of the ring or base 1120, and is received on the other end within an aperture defined by the respective flange portion 1126. Preferably, there are approximately four spring members 1124, substantially equally spaced relative to each other along the periphery of the ring or base 1120 for permitting controlled, lateral movement of the primary pipe 1112 relative to the containment housing 1114 and outer pipe 1118.

Each flange portion 1126 defines an aperture 1128 extending through the side wall of the containment housing 1114, which is closed on one end by a cap 1130. An O-ring or other suitable gasket 1132 is seated between each cap 1130 and the outside surface of the flange portion 1126 to form a substantially fluid-tight seal between the cap and the respective flange portion. As shown in FIG. 29, each aperture 1128 receives one end of a respective spring member 1124, and the respective cap member 1130 serves as a base to support the end of the respective spring member. As will be recognized by those skilled in art, although each spring member 1124 is illustrated as a coil spring, other spring-biasing members may equally be used. For example, resilient plastic members may be used, such as a resilient plastic member coupled in tension between the ring or base 1120 and the side walls of the containment housing 1114.

One advantage of this embodiment of the present invention, is that it permits lateral (which includes radial) movement of the primary pipe 1112 relative to the outer pipe 1118, and other outer components of the system, such as the containment housing 1114, and also permits longitudinal (or axial) movement of the primary pipe relative to the ring or base 1120 and the outer pipe and other outer components. Yet another advantage of this embodiment of the present invention, is that the spring members 1124 (or other biasing numbers) control the lateral movement of the primary pipe 1112 by applying a spring or biasing force against the base or ring 1120, while permitting the primary pipe to move in the lateral direction in a controlled fashion. This is particularly advantageous when vibrations within the system, particularly vibrations of the primary pipe 1112, are a concern, since the spring-biased base or ring 1120 tends to dampen any such vibrational movements.

Another advantage of the centering support of the present invention is that it allows the primary or inner piping portion of a double-containment piping assembly to be vertically supported and centralized (or located in an eccentric position, if necessary) in relative close proximity to elbows while still allowing both longitudinal and lateral (which includes radial) movements of the inner pipe relative to the outer pipe. The centering support of the present invention is therefore particularly useful in the area of elbows or other sections forming a directional change within a double-containment system. The locations of the centering supports of the present invention are selected by starting at the elbow and working away from the elbow toward a fixed point. Successive centering supports are spaced apart from each other at distances equal to the maximum recommended distance between supports to prevent excessive sagging or deformation of the inner pipe. The number of centering supports of the present invention actually used can be determined by performing a stress analysis at the elbow (including the piping immediately adjacent to the elbow).

I claim:

1. A pipe support for a double-containment pipe assembly including an inner pipe contained within an outer pipe, comprising:

a base portion including a curved surface defining a curvature substantially conforming to a curvature of the outer pipe for seating against an inner surface of the outer pipe, and defining a support surface on another side of the base portion relative to the curved surface for supporting the inner pipe within the outer pipe; and means defining an unobstructed path for allowing both (i) lateral movement of the inner pipe relative to the outer pipe, and (ii) longitudinal movement of the inner pipe relative to the outer pipe for accommodating thermal expansion of the inner pipe relative to the outer pipe.

2. A pipe support as defined in claim 1, wherein the means for allowing both lateral and longitudinal movement of the inner pipe relative to the outer pipe includes a laterally-movable support member mounted on the base portion for receiving and supporting the inner pipe within the outer pipe, and being movable with the inner pipe relative to the base portion and outer pipe.

3. A pipe support as defined in claim 2, wherein the laterally-movable support member defines a first surface defining a curvature substantially conforming to the curvature of the inner pipe for receiving the inner pipe.

4. A pipe support as defined in claim 2, wherein the laterally-movable support member includes a second surface seated in engagement with the support surface of the base portion and slidable relative to the support surface of the base portion for lateral movement of the support member and inner pipe relative to the base portion and outer pipe.

5. A pipe support as defined in claim 4, wherein the support surface of the base portion defines a curvature directed generally upwardly toward at least one end of the support surface for moving the inner pipe upwardly with lateral movement of the inner pipe in the direction from an approximately coaxial position toward a non-coaxial position relative to the outer pipe.

6. A pipe support as defined in claim 2, wherein the laterally-movable support member is mechanically coupled to the base portion.

7. A pipe support as defined in claim 6, wherein the laterally-movable support member includes a first section seated on one side of the base portion and a second section seated on an opposite side of the base portion relative to the first section.

8. A pipe support as defined in claim 7, wherein the first and second sections of the laterally-movable support member each define a first dovetail surface, and the base portion defines corresponding second dovetail surfaces seated in engagement with the first dovetail surfaces for interlocking the laterally-movable support and the base portion and permitting lateral movement of the support member relative to the base portion.

9. A pipe support as defined in claim 6, further comprising at least one clamp member coupled to the inner pipe and engaged with the laterally-movable support member for substantially fixing the position of the support member relative to the inner pipe.

10. A pipe support as defined in claim 2, further comprising two stanchion portions, each stanchion portion being coupled to the base portion and spaced apart from the inner pipe on an opposite side of the inner pipe relative to the other stanchion portion, and a pair of spring members, each spring member being coupled between a respective stanchion portion and the laterally-movable support member.

11. A pipe support as defined in claim 2, further comprising means for moving the laterally-movable support member relative to the base portion to permit lateral movement of the inner pipe relative to the outer pipe.

12. A pipe support as defined in claim 11, wherein the means for moving includes at least one of i) a hinge member pivotally coupled on one end to the laterally-movable support member and pivotally coupled on another end to the base portion, and ii) a roller member coupled between the support member and the base portion for rolling the support member relative to the base portion.

13. A pipe support as defined in claim 1, further comprising a pair of stanchion portions, each coupled on one end to the base portion and spaced apart on either side of the inner pipe relative to each other, wherein at least one of the stanchion portions is spaced apart from the inner pipe to thereby define the unobstructed path for allowing the lateral movement of the inner pipe.

14. A pipe support as defined in claim 13, further comprising a crosspiece portion extending between the other ends of the stanchion portions above the inner pipe and defining a space between the crosspiece portion and the inner pipe to permit longitudinal movement of the inner pipe and substantially prevent vertical movement of the inner pipe.

15. A pipe support as defined in claim 1, further comprising a crosspiece portion located on an opposite side of the inner pipe relative to the base portion, a pair of stanchion portions located on opposite sides of the inner pipe relative to each other, each stanchion portion extending between the base portion and the crosspiece portion, and at least one attachment surface for attaching the pipe support to an outer component surrounding the inner pipe.

16. A pipe support as defined in claim 15, wherein the attachment surface is defined by a first flange for coupling to the outer component surrounding the inner pipe.

17. A pipe support as defined in claim 1, wherein said means allows lateral movement of the inner pipe between a coaxial position and a non-coaxial position substantially spaced to at least one side of the coaxial position.

18. A plurality of pipe supports as defined in claim 1, in combination with a double-containment assembly, the combination comprising:

a first anchor support and a second anchor support;

at least one outer pipe section coupled between the first and second anchor supports;

at least one inner pipe section received within the at least one outer pipe section and coupled between the first and second anchor supports; and a plurality of said pipe supports mounted between the at least one inner pipe section and the at least one outer pipe section and substantially equally spaced relative to each other for permitting longitudinal and lateral movement of the at least one inner pipe section relative to the at least one outer pipe section.

19. A plurality of pipe supports in combination with a double-containment assembly as defined in claim 18, wherein the at least one inner pipe section and the at least one outer pipe section each define a substantially straight pipe section, and each pipe support includes means defining an unobstructed path for allowing longitudinal, lateral, and radial movement of the inner pipe section relative to the outer pipe section.

20. A plurality of pipe supports in combination with a double-containment assembly as defined in claim 19, wherein a first pipe support is located at approximately the mid-point between the first and second anchor supports, and the other pipe supports are substantially equally spaced relative to each other between the first pipe support and the anchor supports.

* * * * *